US010329360B2

(12) United States Patent
Luo

(10) Patent No.: US 10,329,360 B2
(45) Date of Patent: Jun. 25, 2019

(54) CATALYST SYSTEM COMPRISING SUPPORTED ALUMOXANE AND UNSUPPORTED ALUMOXANE PARTICLES

(71) Applicant: ExxonMobil Chemical Patents Inc., Baytown, TX (US)

(72) Inventor: Lubin Luo, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/570,849

(22) PCT Filed: Jun. 3, 2016

(86) PCT No.: PCT/US2016/035879
§ 371 (c)(1),
(2) Date: Oct. 31, 2017

(87) PCT Pub. No.: WO2016/197037
PCT Pub. Date: Dec. 8, 2016

(65) Prior Publication Data
US 2018/0142046 A1   May 24, 2018

Related U.S. Application Data

(63) Continuation-in-part of application No. 15/142,321, filed on Apr. 29, 2016, now Pat. No. 9,920,176, (Continued)

(51) Int. Cl.
*C08F 4/02* (2006.01)
*C08F 4/6592* (2006.01)
(Continued)

(52) U.S. Cl.
CPC .......... *C08F 4/65927* (2013.01); *C08F 2/001* (2013.01); *C08F 4/02* (2013.01);
(Continued)

(58) Field of Classification Search
CPC ..... C08F 4/02; C08F 4/65912; C08F 4/65816; C08F 110/06
See application file for complete search history.

(56) References Cited

U.S. PATENT DOCUMENTS

| 5,049,535 A | 9/1991 | Resconi et al. |
| 5,276,208 A | 1/1994 | Winter et al. |

(Continued)

FOREIGN PATENT DOCUMENTS

| CN | 102731691 | 2/2014 |
| EP | 0576970 | 1/1994 |

(Continued)

OTHER PUBLICATIONS

Severn et al., Editors, Tailor-Made Polymers, 2008, p. 103.
(Continued)

*Primary Examiner* — Caixia Lu

(57) ABSTRACT

The invention is directed to a supported olefin polymerization catalyst system comprising catalyst compound, silica support and alumoxane activator, where part of the alumoxane is present on the support and part of the alumoxane is not associated with the support, wherein the silica comprises silica particles having an average surface area of greater than about 400 m²/g, an average pore diameter of less than about 70 Angstroms, and wherein alumoxane is present on the support in an amount of less than 7 mmol Al/g silica and at least 1 wt % of alumoxane particles not associated with the support are present in the catalyst system, based upon the weight of the catalyst system.

49 Claims, 4 Drawing Sheets

D150-60A Silica Derived Unsupported MAO and Supported MAO Particles

Optical   Al mapping   Si mapping

Related U.S. Application Data which is a continuation-in-part of application No. PCT/US2016/030036, filed on Apr. 29, 2016, application No. 15/570,849, which is a continuation-in-part of application No. 15/142,961, filed on Apr. 29, 2016, now Pat. No. 10,077,325, application No. 15/570,849, which is a continuation-in-part of application No. PCT/US2016/030190, filed on Apr. 29, 2016, application No. 15/570,849, which is a continuation-in-part of application No. 15/143,050, filed on Apr. 29, 2016, application No. 15/570,849, which is a continuation-in-part of application No. PCT/US2016/030213, filed on Apr. 29, 2016.

(60) Provisional application No. 62/171,602, filed on Jun. 5, 2015, provisional application No. 62/205,977, filed on Aug. 17, 2015, provisional application No. 62/206,004, filed on Aug. 17, 2016.

(51) Int. Cl.
*C08F 4/642* (2006.01)
*C08F 110/06* (2006.01)
*C08F 4/659* (2006.01)
*C08F 210/06* (2006.01)
*C08F 210/16* (2006.01)
*C08F 2/00* (2006.01)
*C08F 4/64* (2006.01)
C08F 10/06 (2006.01)

(52) U.S. Cl.
CPC ...... *C08F 4/64189* (2013.01); *C08F 4/65916* (2013.01); *C08F 210/06* (2013.01); *C08F 210/16* (2013.01); *C08F 10/06* (2013.01); C08F 2500/12 (2013.01); C08F 2500/15 (2013.01); C08F 2500/24 (2013.01)

(56) References Cited

U.S. PATENT DOCUMENTS

| | | | |
|---|---|---|---|
| 5,278,264 A | 1/1994 | Spaleck et al. |
| 5,411,994 A | 5/1995 | Galli et al. |
| 5,459,117 A | 10/1995 | Ewen |
| 5,532,396 A | 7/1996 | Winter et al. |
| 5,539,076 A | 7/1996 | Nowlin et al. |
| 5,543,373 A | 8/1996 | Winter et al. |
| 5,547,756 A | 8/1996 | Kamo et al. |
| 5,585,509 A | 12/1996 | Langhauser et al. |
| 5,589,549 A | 12/1996 | Govoni et al. |
| 5,631,202 A | 5/1997 | Ewen |
| 5,661,098 A | 8/1997 | Harrison et al. |
| 5,696,045 A | 12/1997 | Winter et al. |
| 5,700,886 A | 12/1997 | Winter et al. |
| 5,770,753 A | 6/1998 | Kueber et al. |
| 5,786,432 A | 7/1998 | Kueber et al. |
| 5,840,644 A | 11/1998 | Kueber et al. |
| 5,990,242 A | 11/1999 | Naga et al. |
| 5,869,584 A | 12/1999 | Winter et al. |
| 6,001,764 A | 12/1999 | Pullukat et al. |
| 6,028,140 A | 2/2000 | Collina et al. |
| 6,051,727 A | 4/2000 | Kueber et al. |
| 6,069,213 A | 5/2000 | Nemzek et al. |
| 6,121,182 A | 9/2000 | Okumura et al. |
| 6,150,481 A | 11/2000 | Winter et al. |
| 6,174,930 B1 | 1/2001 | Agarwal et al. |
| 6,242,544 B1 | 6/2001 | Kueber et al. |
| 6,255,506 B1 | 7/2001 | Kueber et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,376,627 B1 | 4/2002 | Burkhardt et al. |
| 6,399,533 B2 | 6/2002 | Sacchetti et al. |
| 6,429,250 B1 | 8/2002 | Rohrmann et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,673,736 B2 | 1/2004 | Kellum et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,841,501 B2 | 1/2005 | Resconi et al. |
| 6,846,943 B2 | 1/2005 | Nakano et al. |
| 6,855,783 B2 | 2/2005 | Gauthier et al. |
| 6,870,016 B1 | 3/2005 | Burkhardt et al. |
| 6,878,786 B2 | 4/2005 | Resconi et al. |
| 6,916,886 B2 | 7/2005 | Morioka et al. |
| 6,949,614 B1 | 9/2005 | Schottek et al. |
| 6,953,829 B2 | 10/2005 | Kratzer et al. |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,239 B2 | 2/2016 | Jian et al. |
| 9,376,559 B2 | 6/2016 | Holtcamp et al. |
| 9,458,257 B2 | 10/2016 | Funaya et al. |
| 9,464,145 B2 | 10/2016 | Yang et al. |
| 9,644,047 B2 | 5/2017 | Yang et al. |
| 9,718,900 B2 | 8/2017 | Giesbrecht |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 10,077,325 B2 | 9/2018 | Luo et al. |
| 10,119,016 B2 | 11/2018 | Luo et al. |
| 2001/0053833 A1 | 12/2001 | Nakano et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |

(56) References Cited

U.S. PATENT DOCUMENTS

| | | |
|---|---|---|
| 2014/0303308 A1 | 10/2014 | Grestenberger et al. |
| 2014/0357771 A1 | 12/2014 | Tranninger et al. |
| 2015/0025205 A1 | 1/2015 | Yang et al. |
| 2015/0025208 A1 | 1/2015 | Yang et al. |
| 2015/0119537 A1 | 4/2015 | Holtcamp et al. |
| 2015/0183893 A1 | 7/2015 | Yang et al. |
| 2016/0032025 A1 | 2/2016 | Giesbrecht |
| 2016/0137763 A1 | 5/2016 | Holtcamp et al. |
| 2016/0244539 A1 | 8/2016 | Resconi et al. |
| 2016/0335619 A1 | 12/2016 | Ye et al. |
| 2016/0355618 A1 | 12/2016 | Luo et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |
| 2017/0253656 A1 | 9/2017 | Penta et al. |
| 2017/0306136 A1 | 10/2017 | Luo et al. |
| 2017/0342175 A1 | 11/2017 | Hagadorn et al. |
| 2018/0022843 A1 | 1/2018 | Luo et al. |
| 2018/0142045 A1 | 1/2018 | Luo |
| 2018/0162964 A1 | 6/2018 | Yang et al. |
| 2018/0179309 A1 | 6/2018 | Luo et al. |

FOREIGN PATENT DOCUMENTS

| | | |
|---|---|---|
| EP | 0834519 | 4/1998 |
| EP | 1205493 | 5/2002 |
| EP | 1380598 | 1/2004 |
| EP | 1541598 | 6/2005 |
| JP | 2003-073414 | 3/2003 |
| JP | 2012-214709 | 11/2012 |
| WO | 01/48034 | 7/2001 |
| WO | 01/58970 | 8/2001 |
| WO | 02/02575 | 1/2002 |
| WO | 02/02576 | 1/2002 |
| WO | 03/002583 | 1/2003 |
| WO | 03/045551 | 6/2003 |
| WO | 03/051934 | 6/2003 |
| WO | 2004/052945 | 6/2004 |
| WO | 2004/092225 | 10/2004 |
| WO | 2004/106351 | 12/2004 |
| WO | 2014/016318 | 1/2014 |
| WO | 2015/065676 | 5/2015 |
| WO | 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |

OTHER PUBLICATIONS

Imhoff et al., "Characterization of Methylaluminoxanes and Determination of Trimethylaluminum Using Proton NMR", Organometallics, 1998, vol. 17, pp. 1941-1945.

Kaminsky, "Highly Active Metallocene Catalysts for Olefin Polymerization ," Journal of Chemical Society, Dalton Trans., 1998, pp. 1413-1418.

Sinn, "Proposals for Structure and Effect of Methylalumoxane Based on Mass Balances and Phase Separation Experiments," Macromolecular Symposia, 1995, vol. 97, Issue 1, pp. 27-52.

Mortazavi et al., "Characterization of MAO-Modified Silicas for Ethylene Polymerization," Journal of Applied Polymer Science, 2013, vol. 130, No. 6, pp. 4568-4575.

Chen et al., "Preparation and characterization of agglomerated porous hollow silica supports for olefin polymerization catalyst," Journal of Non-Crystalline Solids, 2007, vol. 353, No. 11-12, pp. 1030-1036.

Pasquini, N. (Ed.), Polypropylene Handbook, 2005, 2nd Ed., Hanser Publishers, Munich, pp. 78-89.

Shinamoto et al., "Microspherical Silica Supports with High Pore Volume for Metallocene Catalysts," presented at Metallocenes Europe '97 Dusseldorf, Germany, Apr. 8-9, 1997.

Smit et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.

Von Hohenesche et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.

Cecchin et al, "On the Mechanism of Polypropene Growth over MgCl2/TiCl4 Catalyst Systems," Macromolecular Chemistry and Physics, 2001, vol. 202, No. 10, p. 1987-1994.

D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.

Zheng et al., "Fragmentation Behavior of Silica-Supported Metallocene/MAO Catalysts in the Early Stages of Olefin Polymerization." Macromolecules. 2005. vol. 35. No. 11. pp. 4673-4678.

U.S. Appl. No. 15/570,809, filed Oct. 31, 2017 Yang et al.
U.S. Appl. No. 15/570,835, filed Oct. 31, 2017 Luo.
U.S. Appl. No. 15/570,849, filed Oct. 31, 2017 Luo.
U.S. Appl. No. 15/644,528, filed Oct. 26, 2017 Luo et al.
U.S. Appl. No. 15/722,926, filed Oct. 2, 2017 Luo et al.

Resconi et al., "Metallocene Catalysts for Propylene Polymerization," Polypropylene Handbook, Pasquini, Ed., Chapter 2.2, Hanser Publications, Munic, 2005.

Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172 (1-2), pp. 43-65.

Tynys et al., "Ethylene-Propylene Copolymerizations: Effect of Metallocene Structure on Termination Reactions and Polymer Miscrostructure," Macromolecular Chemical Phys., 2005, vol. 206, pp. 1043-1056.

U.S. Appl. No. 15/570,814, filed Oct. 31, 2017.
U.S. Appl. No. 16/301,596, filed Nov. 14, 2018.

FIG. 1: D150-60A Silica Derived Unsupported MAO and Supported MAO Particles
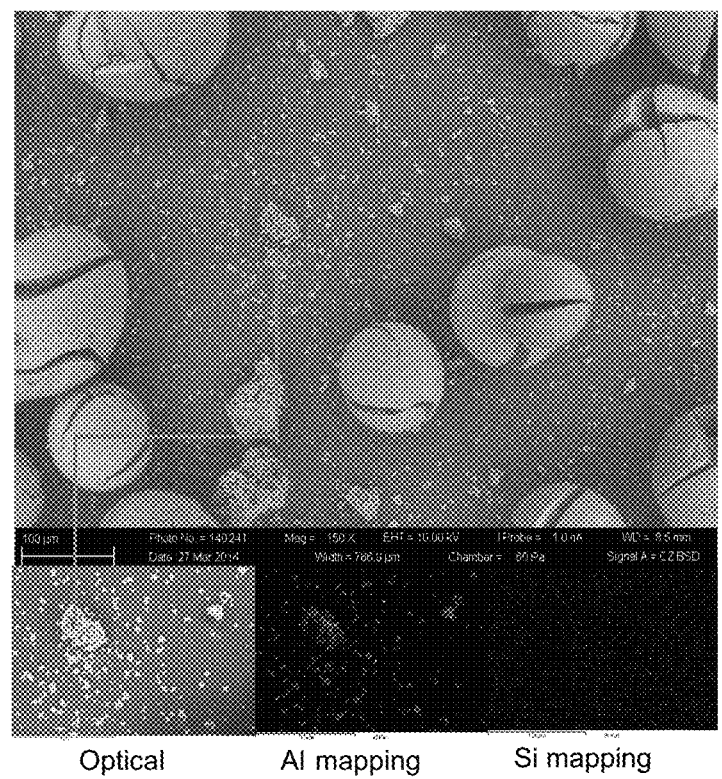

FIG. 2: P-3 Silica Derived MAO particles and Supported MAO Particles
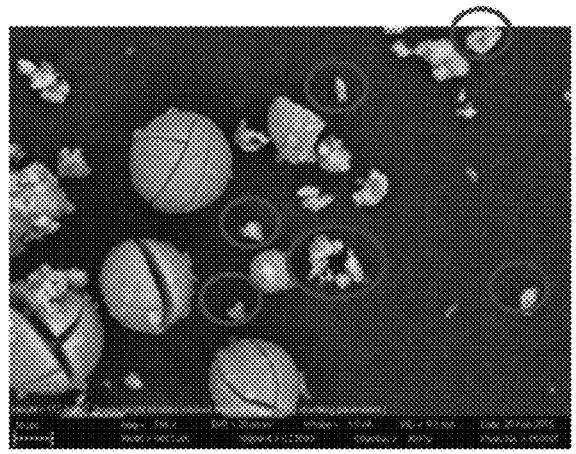
Optical
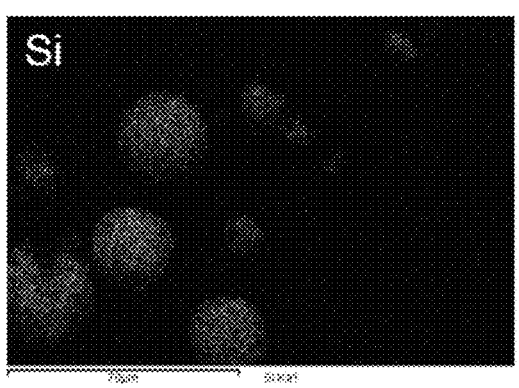 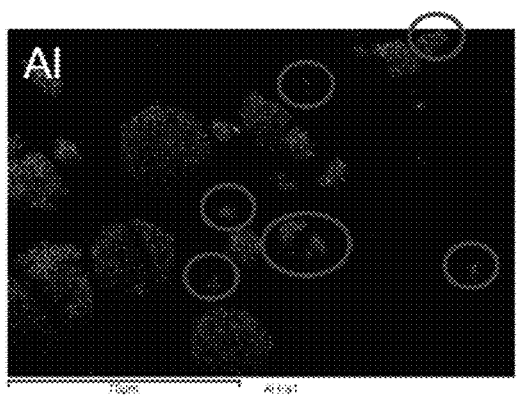
Si and Al Mapping

CATALYST SYSTEM COMPRISING SUPPORTED ALUMOXANE AND UNSUPPORTED ALUMOXANE PARTICLES

PRIORITY

This invention is a § 371 National Phase application of PCT/US2016/035879, filed Jun. 3, 2016 and is a continuation-in-part of U.S. Ser. No. 15/142,321 and PCT/US2016/030036, both filed Apr. 29, 2016, which claim priority to and the benefit of U.S. Ser. No. 62/171,602, filed Jun. 5, 2015; this invention is a continuation-in-part of U.S. Ser. No. 15/142,961 and PCT/US2016/030190, both filed Apr. 29, 2016, which claim priority to and the benefit of 62/205,977, filed Aug. 17, 2015, and U.S. Ser. No. 62/171,602, filed Jun. 5, 2015; this invention is also a continuation-in-part of U.S. Ser. No. 15/143,050 and PCT/US2016/030213, both filed Apr. 29, 2016, which claim priority to and the benefit of 62/206,004, filed Aug. 17, 2015, and U.S. Ser. No. 62/171,602, filed Jun. 5, 2015.

CROSS REFERENCE TO RELATED APPLICATIONS

This invention relates to: U.S. Ser. No. 15/142,021, filed Apr. 29, 2016, which claims priority to and the benefit of 62/171,581 filed Jun. 5, 2015; U.S. Ser. No. 15/142,084, filed Apr. 29, 2016, which claims priority to and the benefit of 62/171,590, filed Jun. 5, 2015; U.S. Ser. No. 15/142,268, filed Apr. 29, 2016, which claims priority to and the benefit of 62/171,630, filed Jun. 5, 2015; U.S. Ser. No. 15/142,377, filed Apr. 29, 2016, which claims priority to and the benefit of 62/171,616, filed Jun. 5, 2015; PCT/US2016/034755, filed May 27, 2016; PCT/US2016/034760, filed May 27, 2016; PCT/US2016/034768, filed May 27, 2016; and PCT/US2016/034784, filed May 27, 2016.

FIELD OF THE INVENTION

This invention relates to olefin polymerization catalyst systems comprising silica supports, a catalyst precursor, alumoxane present on the silica support, and particles of alumoxane, methods for producing such catalysts systems, and methods for polymerizing olefins using such catalyst systems.

BACKGROUND OF THE INVENTION

The discovery of metallocene catalysts activated with alumoxanes has enabled the synthesis of new polyolefins with improved properties. However, metallocene produced polymers are known to have targeted properties, such as narrow molecular weight distributions, which can lead to uneven product properties, e.g., good strength but poor processability.

Thus, there is a need for catalyst systems, particularly metallocene catalyst systems, that are capable of producing polymers having multimodal properties, such as molecular weight distribution, in a variety of polymerization processes.

There is also a need for catalyst systems comprising a single catalyst precursor that are capable of producing olefin polymers having bimodal molecular weight distribution via one-reactor polymerization.

Traditional methods to obtain multimodal molecular weight distributions include, using a single-catalyst system to perform multiple polymerization in a sequential polymerization processes, as well as a reactor system using differing hydrogen concentrations in different reactors. Likewise, using a multi-catalyst system to perform polymerization in a single reactor has also been used. However, continuous single reactor operation is difficult and often requires trim catalyst, which is usually one of the catalysts in the multi-catalyst system added to the polymerization reactor during the polymerization process to compensate for differing, activities, lifetime, etc., of the different active catalyst species which is neither cost effective nor operation friendly, for example, see U.S. Pat. No. 8,318,872.

WO 03/051934 discloses an alternative form of catalyst which is provided in solid form but does not require a conventional external carrier material such as silica. The alternative form is based on the finding that a homogeneous catalyst system containing an organometallic compound of a transition metal can be converted, in a controlled way, to solid, uniform catalyst particles by first forming a liquid/liquid emulsion system, which comprises a homogeneous solution of catalyst components as the dispersed phase, and as the continuous phase solvent where the catalyst solution is as dispersed droplets therewith, and then solidifying said dispersed droplets to form solid particles comprising the said catalyst.

Additional references of interest include: Pullukat, T. J., et al., "*Microspherical Silica Supports with High Pore Volume for Metallocene Catalysts*," presented at Metallocenes Europe '97, Dusseldorf, Germany, Apr. 8-9, 1997, pp. 1-11; U.S. Pat. No. 6,001,764; Nello Pasquini (Ed.), Polypropylene Handbook, $2^{nd}$ Edition, Hanser Publisher, Munich, 2005, pp 361-380; U.S. Pat. Nos. 8,729,206; and 6,001,764.

Thus, there is a need for a single-catalyst system that can be run in a continuous single reactor system (such as a gas phase reactor system), to produce multimodal polymer products. It is particularly desirable that the system operate well under constant reaction conditions in a continuous process (such one having continuous monomer feeds and or continuous polymer withdrawal) to produce multimodal (such as multimodal molecular weight distribution) polymer products to reduce cost and simplify operation.

SUMMARY OF THE INVENTION

This invention is directed to a supported olefin polymerization catalyst system comprising catalyst compound, silica support and alumoxane activator, where part of the alumoxane is present on the support and part of the alumoxane is not associated with the support, wherein the silica comprises silica particles having an average surface area of greater than about 400 $m^2/g$, an average pore diameter of less than about 70 Angstroms, and wherein alumoxane is present on the support in an amount of less than 7 mmol Al/g silica and at least 1 wt % of alumoxane particles not associated with the support are present in the catalyst system, based upon the weight of the catalyst system.

The invention is also directed to a method for making an alumoxane activator composition comprising contacting an alumoxane with a silica support at a temperature of from 20 to 110° C. to form supported alunoxane and alumoxane particles separate form the support, wherein the support comprises particles having: (i) an average surface area of greater than about 400 $m^2/g$; and (ii) an average pore diameter of less than about 70 Angstroms wherein alumoxane is present on the support in an amount of less than 7 mmol Al/g silica and at least 1 wt % of alumoxane particles not associated with the support are present in the catalyst system, based upon the weight of the catalyst system.

The alumoxane activator composition is then contacted with a catalyst precursor to form a catalyst system.

The invention is also directed to methods for polymerization of olefins using the catalyst systems disclosed herein. The catalyst system may be a single site catalyst system, preferably a metallocene catalyst system. The resulting polymer can have a multimodal molecular weight distribution. Preferably the catalyst system can produce polymer products with multi-modal molecular weight distribution and/or molecular weight distribution over 3.0 in a continuous single reactor system under constant reaction conditions.

BRIEF DESCRIPTION OF THE DRAWINGS

FIG. 1 is an Al and Si elemental mapping of Example 3 from Table 2 showing MAO particles separate from the silica support.

FIG. 2 is an Al and Si elemental mapping of Example 8 from Table 2 showing MAO particles separate from the silica.

DEFINITIONS

Figure 3:
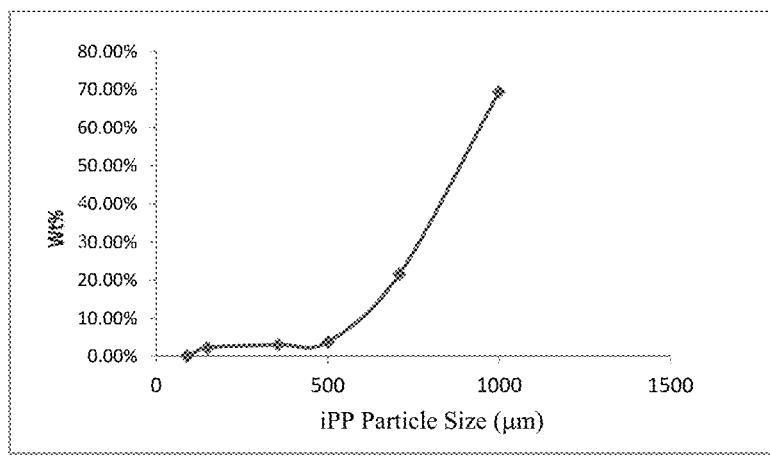
FIG. 3 is a graph of isotactic polypropylene particle size distribution (particle size versus wt %) for the iPP obtained from Example 9 from Table 3.
Figure 4:
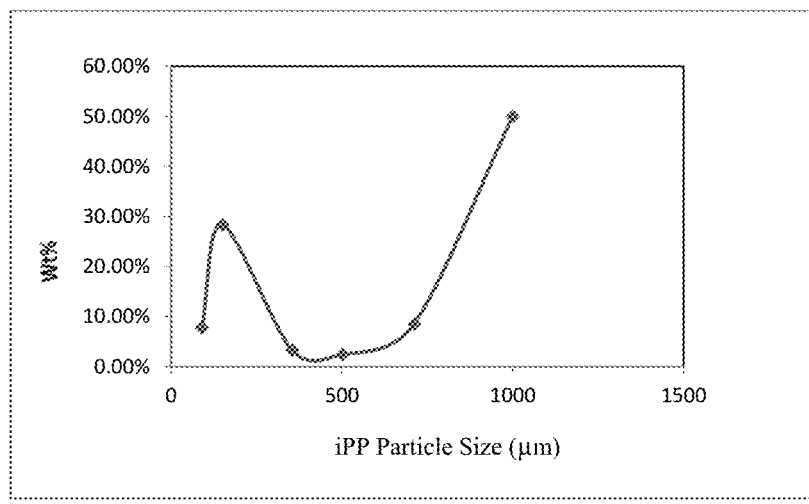
FIG. 4 is a graph of isotactic polypropylene particle size distribution (particle size versus wt %) for the iPP obtained from example Example 10 from Table 3.
Figure 5:
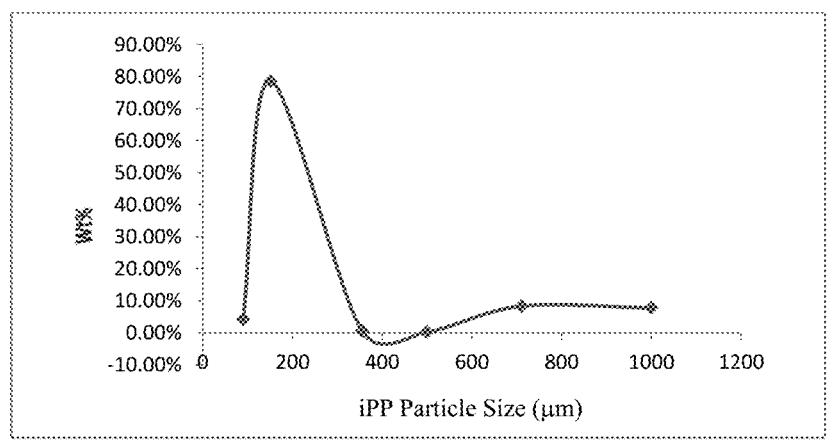
FIG. 5 is a graph of isotactic polypropylene particle size distribution (particle size versus wt %) for the iPP obtained from example Example 11 from Table 3.

For purposes of this disclosure and the claims appended thereto, the new numbering scheme for the Periodic Table Groups is used as described in CHEMICAL AND ENGINEERING NEWS, 63(5), p. 27, (1985).

For purposes herein, particle size (PS) or diameter, and distributions thereof, are determined by laser diffraction using a MASTERSIZER 3000 (range of 1 to 3500 μm) available from Malvern Instruments, Ltd., Worcestershire, England, or an LS 13320 MW with a micro liquid module (range of 0.4 to 2000 μm) available from Beckman Coulter, Inc., Brea, Calif., in event of conflict between the results, the LS 13320 shall be used. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the primary particles in agglomerates or the elementary particles in an aggregate.

The term "agglomerate" as used herein refers to a material comprising an assembly of primary particles held together by adhesion, i.e., characterized by weak physical interactions such that the particles can easily be separated by mechanical forces, e.g., particles joined together mainly at corners or edges. The term "primary particles" refers to the smallest, individual disagglomerable units of particles in an agglomerate (without fracturing), and may in turn be an encapsulated agglomerate, an aggregate or a monolithic particle. Agglomerates are typically characterized by having an SA not appreciably different from that of the primary particles of which it is composed. Silica agglomerates are prepared commercially, for example, by a spray drying process. The terms "disagglomeration" and "disagglomerating" are defined at paragraph [0047], page 7 of PCT/US2016/030036. The terms "fracturing," "fragmentation," and "fragmenting" are defined at paragraphs [0048]-[0049], pages 7-8 of PCT/US2016/030036. The terms "monolith" and "monolithic" are defined at paragraph [0044], page 7 of PCT/US2016/030036.

"Aggregates" are an assembly of elementary particles sharing a common crystalline structure, e.g., by a sintering or other physico-chemical process such as when the particles grow together. Aggregates are generally mechanically unbreakable, and the specific surface area of the aggregate is substantially less than that of the corresponding elementary particles. An "elementary particle" refers to the individual particles or grains in or from which an aggregate has been assembled. For example, the primary particles in an agglomerate may be elementary particles or aggregates of elementary particles. For more information on agglomerates and aggregates, see Walter, D., Primary Particles—Agglomerates—Aggregates, in Nanomaterials (ed Deutsche Forschungsgemeinschaft), Wiley-VCH Verlag GmbH & Co. KGaA, Weinheim, Germany, doi: 10.1002/9783527673919, pp. 1-24 (2013).

The terms "capsule" or "encapsulated" or "microencapsulated" are used interchangeably herein to refer to an agglomerate in the 1-1000 μm size range comprising an exterior surface that is coated or otherwise has a physical barrier that inhibits disagglomeration of the primary particles from the interior of microencapsulated agglomerate. The barrier or coating may be an aggregate, for example, of primary and/or elementary particles otherwise constituted of the same material as the agglomerate. FIG. 1 of concurrently filed PCT/US2016/035854 shows examples of microencapsulated agglomerates 10 comprised of a plurality of primary particles 12 within an outer aggregate surface or shell 14 that partially or wholly encapsulates the agglomerates, in which the primary particles may be allowed to disagglomerate by fracturing, breaking, dissolving, chemically degrading or otherwise removing all or a portion of the shell 14.

For purposes herein "mean" refers to the statistical mean or average, i.e., the sum of a series of observations or statistical data divided by the number of observations in the series, and the terms mean and average are used interchangeably; "median" refers to the middle value in a series of observed values or statistical data arranged in increasing or decreasing order, i.e., if the number of observations is odd, the middle value, or if the number of observations is even, the arithmetic mean of the two middle values.

For purposes herein, the mode, also called peak value or maxima, refers to the value or item occurring most frequently in a series of observations or statistical data, i.e., the inflection point. An inflection point is that point where the second derivative of the curve changes in sign. Thus, a peak particle size is the particle size occurring at the peak value. For purposes herein, a multimodal distribution is one having two or more peaks or inflection points, i.e., a distribution having a plurality of local maxima; a bimodal distribution has two peak or inflection points; and a unimodal distribution has one peak or inflection point. For example, a bimodal particle size distribution in graph of particle size vs wt % particles would have two peaks or inflection points. Likewise, a multimodal particle size distribution in graph of particle size vs wt % particles would have at least two peaks or inflection points.

For purposes herein, the surface area (SA, also called the specific surface area or BET surface area), pore volume (PV), and pore diameter (PD) of catalyst support materials are determined by the Brunauer-Emmett-Teller (BET) method using adsorption-desorption of nitrogen (temperature of liquid nitrogen: 77 K) with a MICROMERITICS TRISTAR II 3020 instrument or MICROMERITICS ASAP 2420 instrument after degassing of the powders for 4 to 8 hours at 100 to 300° C. for raw/calcined silica or 4 hours to overnight at 40 to 100° C. for silica supported alumoxane. More information regarding the method can be found, for example, in "*Characterization of Porous Solids and Powders: Surface Area, Pore Size and Density*," S. Lowell et al., Springer, 2004. PV refers to the total PV, including both internal and external PV. Mean PD refers to the distribution of total PV with respect to PD.

For purposes herein, porosity of polymer particles refers to the volume fraction or percentage of PV within a particle or body comprising a skeleton or matrix of the matrix (typically propylene) polymer, on the basis of the overall volume of the particle or body with respect to total volume. The porosity and median PD of polymer particles are determined using mercury intrusion porosimetry. Mercury intrusion porosimetry involves placing the sample in a penetrometer and surrounding the sample with mercury. Mercury is a non-wetting liquid to most materials and resists entering voids, doing so only when pressure is applied. The pressure at which mercury enters a pore is inversely proportional to the size of the opening to the void. As mercury is forced to enter pores within the sample material, it is depleted from a capillary stem reservoir connected to the sample cup. The incremental volume depleted after each pressure change is determined by measuring the change in capacity of the stem. This intrusion volume is recorded with the corresponding pressure. Unless otherwise specified, all porosimetry data are obtained using MICROMERITICS ANALYTICAL SERVICES and/or the AUTOPORE IV 9500 mercury porosimeter.

The skeleton of the matrix phase of a porous, particulated material in which the pores are formed is inclusive of nonpolymeric and/or inorganic inclusion material within the skeleton, e.g., catalyst system materials including support material, active catalyst system particles, catalyst system residue particles, or a combination thereof. As used herein, "total volume" of a matrix refers to the volume occupied by the particles comprising the matrix phase, i.e., excluding interstitial spaces between particles but inclusive of interior pore volumes or internal porosity within the particles. "Internal" or "interior" pore surfaces or volumes refer to pore surfaces and/or volumes defined by the surfaces inside the particle which cannot be contacted by other similar particles, as opposed to external surfaces which are surfaces capable of contacting another similar particle.

Where the matrix (typically propylene) polymer is wholly or partially filled, e.g., in the context of the pores containing a dispersed phase (such as fill rubber or fill material other than the matrix polymer), the porosity also refers to the fraction of the void spaces or pores within the particle or body regardless of whether the void spaces or pores are filled or unfilled, i.e., the porosity of the particle or body is calculated by including the volume of the fill material as void space as if the fill material were not present.

For purposes herein, "as determined by mercury intrusion porosimetry" shall also include and encompass "as if determined by mercury intrusion porosimetry," such as, for example, where the mercury porosimetry technique cannot be used, e.g., in the case where the pores are filled with a non-gaseous material such as a fill phase. In such a case, mercury porosimetry may be employed on a sample of the material obtained prior to filling the pores with the material or just prior to another processing step that prevents mercury porosimetry from being employed, or on a sample of the material prepared at the same conditions used in the process to prepare the material up to a point in time just prior to filling the pores or just prior to another processing step that prevents mercury porosimetry from being employed.

For purposes of this specification and the claims appended thereto, when referring to polymerizing in the presence of at least X mmol hydrogen or other chain transfer or termination agent ("CTA") per mole of propylene, the ratio is determined based upon the amounts of hydrogen or other chain transfer agent and propylene fed into the reactor. A "chain transfer agent" is hydrogen or an agent capable of hydrocarbyl and/or polymeryl group exchange between a coordinative polymerization catalyst and a metal center of the CTA during polymerization.

Unless otherwise indicated, the terms "catalyst productivity," "catalyst activity," and "conversion" are defined at page 8, paragraph [0051]-[0053] of PCT/US2016/030036, filed Apr. 29, 2016, are incorporated by reference herein.

An "olefin," alternatively referred to as "alkene," is a linear, branched, or cyclic compound of carbon and hydrogen having at least one double bond. For the purposes of this invention, ethylene shall be considered an α-olefin. An "alkene" group is a linear, branched, or cyclic radical of carbon and hydrogen having at least one double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

An "ethylene polymer" or "polyethylene" or "ethylene copolymer" is a polymer or copolymer comprising at least 50 mol % ethylene derived units; a "propylene polymer" or "polypropylene" or "propylene copolymer" is a polymer or copolymer comprising at least 50 mol % propylene derived units; and so on. The term "polypropylene" is meant to encompass isotactic polypropylene (iPP), defined as having at least 10% or more isotactic pentads, highly isotactic polypropylene, defined as having 50% or more isotactic pentads, syndiotactic polypropylene (sPP), defined as having at 10% or more syndiotactic pentads, homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene and $C_4$ to $C_8$ 1-olefins. Preferably isotactic polymers (such as iPP) have at least 20% (preferably at least 30%, preferably at least 40%) isotactic pentads. A polyolefin is "atactic," also referred to as "amorphous," if it has less than 10% isotactic pentads and syndiotactic pentads.

The terms "ethylene-propylene rubber" or "EP rubber" (EPR) mean a copolymer of ethylene and propylene, and optionally one or more diene monomer(s), where the ethylene content is from 35 to 85 mol %, the total diene content is 0 to 5 mol %, and the balance is propylene with a minimum propylene content of 15 mol %.

The term "hetero-phase" or "heterophasic" refers to the presence of two or more morphological phases in a composition comprising two or more polymers, where each phase comprises a different polymer or a different ratio of the polymers as a result of partial or complete immiscibility (i.e., thermodynamic incompatibility). A common example is a morphology consisting of a continuous matrix phase and at least one dispersed or discontinuous phase. The dispersed phase takes the form of discrete domains (particles) distributed within the matrix (or within other phase domains, if there are more than two phases). Another example is a co-continuous morphology, where two phases are observed but it is unclear which one is the continuous phase, and which is the discontinuous phase, e.g., where a matrix phase has generally continuous internal pores and a fill phase is deposited within the pores, or where the fill phase expands within the pores of an initially globular matrix phase to expand the porous matrix globules, corresponding to the polymer initially formed on or in the support agglomerates, into subglobules which may be partially or wholly separated and/or co-continuous or dispersed within the fill phase, corresponding to the polymer formed on or in the primary particles of the support. For example, a polymer globule may initially have a matrix phase with a porosity corresponding to the support agglomerates, but a higher fill phase due to expansion of the fill phase in interstices between subglobules of the matrix phase.

The presence of multiple phases is determined using microscopy techniques, e.g., optical microscopy, scanning electron microscopy (SEM), or atomic force microscopy (AFM); or by the presence of two glass transition (Tg) peaks in a dynamic mechanical analysis (DMA) experiment; or by a physical method such as solvent extraction, e.g., xylene extraction at an elevated temperature to preferential separate one polymer phase; in the event of disagreement among these methods, DMA performed according to the procedure set out in US 2008/0045638 at page 36, including any references cited therein, shall be used.

A "polypropylene impact copolymer" or simply an "impact copolymer" (ICP), is a combination, typically heterophasic, of crystalline and amorphous polymers, such as, for example, iPP and rubber, which provide the ICP with both stiffness and toughness, i.e., a stiffness greater than that of one or more of the amorphous polymer(s) and a toughness greater than that of one or more of the crystalline polymer(s). An ICP may typically have a morphology such that the matrix phase comprises a higher proportion of the crystalline polymer, and a rubber is present in a higher proportion in a dispersed or co-continuous phase, e.g., a blend comprising 60 to 95 wt % of a matrix of iPP, and 5 to 40 wt % of an ethylene, propylene or other polymer with a $T_g$ of $-30°$ C. or less.

The term "sequential polymerization" refers to a polymerization process wherein different polymers are produced at different periods of time in the same or different reactors, e.g., to produce a multimodal and/or heterophasic polymer. The terms "gas phase polymerization," "slurry phase polymerization," "homogeneous polymerization process," and "bulk polymerization process" are defined below.

The term "continuous" means a system that operates without interruption or cessation. For example, a continuous process to produce a polymer would be one where the reactants are continually introduced into one or more reactors and polymer product is continually withdrawn.

The term "different" means the compositions in question differ by at least one atom. For example, cyclopentadiene differs from methyl cyclopentadiene in the presence of the methyl group. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl. A catalyst is the same if it is not different as defined above.

A "catalyst system" is a combination of at least one catalyst precursor compound, at least one activator, an optional co-activator, and a support material. A polymerization catalyst system is a catalyst system that can polymerize monomers to polymer.

A "supported alumoxane" or "supported MAO" is alumoxane existing inside of pores of a support, such as silica, or adhearing to or coated on such support. A "supported alumoxane particle" or "supported MAO particle" is an alumoxane particle existing inside of pores of a support, such as silica, or adhearing to or coated on such support. An "unsupported alumoxane particle," an "unsupported MAO particle," or an "alumoxane particle not associated with a support" is an alumoxane particle existing outside of pores of a support, such as silica, and not adhearing to or coated on such support.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

A substituted hydrocarbyl radical is a hydrocarbyl radical where at least one hydrogen has been replaced by a heteroatom or heteroatom-containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where R* is independently a hydrocarbyl or halocarbyl radical and two or more R* may join together to form a substituted or unsubstituted saturated, partially unsaturated or aromatic cyclic or polycyclic ring structure.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl," or "substituted indenyl," or "substituted aryl," the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

As used herein, Mn is number average molecular weight, Mw is weight average molecular weight, Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weights (e.g., Mw, Mn, and Mz) are reported in g/mol and are determined by GPC-4D as described below.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate, and MCN is metallocene.

Room temperature, also called ambient temperature, is 23° C., unless otherwise indicated.

DETAILED DESCRIPTION OF THE INVENTION

It has been surprisingly found that a catalyst system that comprises both supported alumoxane and small (1 to 40 microns) unsupported alumoxane particles can be particularly useful in production of a polyolefin-based homo- or co-polymers having tailored molecular weight distribution, for example, a multimodal, such as bimodal, molecular weight distribution (Mw/Mn). Particularly, it has been observed that bimodal Mw can be obtained from a catalyst system that comprises catalyst compound in association with both unsupported alumoxane particles and supported alumoxane. Activated catalyst comprising the unsupported alumoxane portion have significantly higher activities than the activated catalyst comprising supported alumoxane and thus can produce polymers or copolymers having higher molecular weight. Thus by adjusting the amount of supported and unsupported alumoxane, a desired molecular weight distribution can be obtained.

This invention is directed to a supported olefin polymerization catalyst system comprising catalyst compound, silica support and alumoxane activator, where part of the alumoxane is present on the support and part of the alumoxane is not associated with the support, wherein the silica comprises silica particles having an average surface area of 400 to 800 $m^2/g$, an average pore diameter of 40 to 70 Angstroms, and wherein alumoxane is present on the support in an amount 0.1 to less than 7 mmol Al/g silica (alternately 1 to less than 7 mmol Al/g silica) and 1 to 50 wt % of alumoxane particles not associated with the support are present in the catalyst system, based upon the weight of the catalyst system.

This invention is also directed to a catalyst system comprising catalyst compound, silica support and alumoxane activator, where part of the alumoxane is present on the support ("supported alumoxane") and part of the alumoxane is not associated with the support ("unsupported alumoxane"), wherein:

i) the support comprises silica particles having, prior to combination with the alumoxane, an average surface area of greater than about 400 $m^2/g$ and an average pore diameter of less than about 70 Angstroms;

ii) alumoxane is present on the support in an amount of less than 7 mmol Al/g silica; and iii) the catalyst system comprises at least 1 wt % of unsupported alumoxane particles, based upon the weight of the catalyst system.

This invention is also directed to a process of making a catalyst system, the process comprising:

(a) providing a support wherein the support comprises silica particles having, prior to combination with the alumoxane, an average surface area of greater than about 400 $m^2/g$, an average pore diameter of less than about 70 Angstroms;

(b) contacting alumoxane (at a concentration of greater than 7 mmol Al/g silica, alternately greater than 9 mmol Al/g silica, alternately greater than 11 mmol Al/g silica, alternately greater than 13 mmol Al/g silica) and the support at a temperature of from 0 to 120° C. (alternately 0 to 100° C.) to form supported alumoxane and unsupported alumoxane particles wherein alumoxane is present on the support ("supported alumoxane"), in an amount of less than 7 mmol Al/g silica and at least 1 wt %, based upon the weight of the catalyst system, of alumoxane particles not associated with the support ("unsupported alumoxane"), are present in the catalyst system; and (c) contacting the supported alumoxane and unsupported alumoxane particles with a single site catalyst precursor compound to form the catalyst system.

This invention is also related to a process of making a catalyst system, the process comprising:

(a) providing a support, wherein the support comprises silica particles having, prior to combination with the alumoxane, an average surface area of greater than about 400 $m^2/g$ and an average pore diameter of less than about 70 Angstroms;

(b) contacting alumoxane and the support at a temperature of from 0 to 120° C. to form particles of alumoxane on the support ("supported alumoxane") and particles of alumoxane not associated with the support ("unsupported alumoxane");

wherein alumoxane is present on the support in an amount of less than 7 mmol Al/g silica, and the catalyst system comprises at least 1 wt % of unsupported alumoxane particles, based upon the weight of the catalyst system; and (c) contacting the supported alumoxane and unsupported alumoxane particles with a single site catalyst precursor compound to form the catalyst system.

This invention is also directed to a method for making a silica supported alumoxane comprising contacting a first alumoxane with a first support at a temperature of from −20 to 80° C. to form a first mixture, the first alumoxane being present in an amount of less than 7 mmol Al/g on the first support; contacting a second alumoxane with a second support at a temperature of from 40 to 120° C. to form a second mixture, the second alumoxane being present in an amount of greater than 7 mmol Al/g on the second support; combining the first mixture and the second mixture to form supported alumoxane and unsupported alumoxane particles; contacting a catalyst precursor with the supported alumoxane and unsupported alumoxane particles to form the catalyst system; wherein each of the first and the second support comprises particles having: (i) an average surface area of greater than about 400 m$^2$/g; and (ii) an average pore diameter of less than about 140 Angstrom. Advantageously the first support has an average particle size of 50 μm or more, and the second support has an average particle size of less than 50 μm.

The invention is also directed to a method for making a silica supported alumoxane comprising contacting an alumoxane with the mixture of a first support and a second support at a temperature of from −20 to 120° C. to form a supported alumoxane and unsupported alumoxane mixture, with the alumoxane being present in an amount of more than 7 mmol Al/g on both first and second support; contacting a catalyst precursor with the supported alumoxane and unsupported alumoxane particles to form the catalyst system; wherein the first support comprises particles having: (i) an average surface area of greater than about 400 m$^2$/g; and (ii) an average pore diameter of less than about 140 Angstroms and the second support comprises particles having (i) an average surface area of greater than about 200 m$^2$/g; and (ii) an average pore diameter of more than about 140 Angstroms. Advantageously the first support has an average particle size of greater than 90 μm, and the second support has an average particle size of less than 90 μm.

The invention is also directed to a method for making a silica supported alumoxane comprising:
(a) contacting a first alumoxane with a first support at a temperature of from −20 to 80° C. to form a first mixture;
(b) contacting a second alumoxane with a second support at a temperature of from 40 to 120° C. (alternately 80 to 100° C.) to form a second mixture, where more than 7 mmol Al/g support is added to the second mixture, the second alumoxane being present on the support in an amount of less than 7 mmol Al/g on the second support and unsupported alumoxane particles;
(c) combining the first mixture and the second mixture to form a third mixture of supported alumoxame and unsupported alumoxane particles;
(d) contacting a single site catalyst precursor compound with the third mixture to form the catalyst system;
wherein the second supports comprises particles having:
an average surface area of greater than about 400 m$^2$/g, an average pore diameter of less than about 70 Angstroms, and wherein at least 1 wt % of alumoxane particles not associated with the support are present in the catalyst system, based upon the weight of the catalyst system.

Any of the embodiments described herein may use a single alumoxane (such as MAO) or different alumoxanes. In useful embodiments where two supports are present, the alumoxane may the same or different.

Accordingly, the present invention provides catalyst systems that can be used in production of olefin-based homopolymers or copolymers having bimodal molecular weight distributions and or broad molecular weight distributions (Mw/Mn of 3.0 or more, alternately 5.0 or more).

Alumoxane molecules, in commercially available embodiments, often have a molecule size of about 15 to 20 Angstroms. Thus, the pore diameter of the silica support must be large enough to enable the alumoxane to enter the pores for high MAO loadings (greater than 7 mmolAl/g support) and evenly coat the pore surface. Pore diameters that are too large, however, can result in highly hollow silica particles with very thin walls that do not have the mechanical strength to maintain their structure in a catalyst preparation or polymerization environment where factors such as high temperature, pressure, or agitation power are involved. For silica with high surface area (greater than 600 m$^2$/g), the pore diameter is reduced to enhance the mechanical strength. It has been discovered that if the pore diameter is reduced to a size comparable with the MAO molecule, e.g., 50-70 Angstroms, when heating is applied and/or excess MAO is charged to the support/carrier combination, unsupported MAO particles can form.

The amounts of both supported alumoxane and unsupported alumoxane particles can be manipulated through the change of reaction conditions, such as the amount of alumoxane charged to the mixture of support and liquid (such as toluene or an alkane, such as hexane) and the reaction temperature applied to the mixture to dry the support, typically to a free flowing state. For example, D150-60A silica having a 64 Angstrom pore diameter and 733 m$^2$/g surface area can produce both supported alumoxane and unsupported alumoxane particles if the alumoxane charged to the mixture of support and alumoxane is larger than 7 mmol Al/g silica and the mixture is heated to dry the support. The amount of unsupported particles produced varies with, among other things, the concentration of the alumoxane and the heat applied during drying. If more unsupported alumoxane particles are desired, more alumoxane can be added to the starting mixture and then heated to temperatures as high as 120° C. or more, typically from 30 to 110° C., typically from 80 to 110° C. These mixtures of supported alumoxane and unsupported alumoxane particles are then contacted with catalyst compounds to form catalyst systems. The particle sizes of the unsupported MAO particles produced herein typically have a defined particle size distribution, e.g., in the range of about 1 to 10 μm.

The support may comprise silica particles having an average surface area of greater than about 400, 450, 500, 550, or 600 m$^2$/g, and optionally less than about 1,200, 1,000, or 800 m$^2$/g, e.g., from 400 to 1,200 m$^2$/g, from 400 to 1,000 m$^2$/g, or from about 450 to 800 m$^2$/g, or from about 500 to 700 m$^2$/g or any combinations of any upper or lower value disclosed herein.

The support may comprise silica particles having an average pore volume of from about 0.5 to 2.5 ml/g of silica. The average pore volume may range from a low of about 0.5, 0.7, 1.0, 1.1, 1.3, or 1.4 ml/g of silica to a high of about 1.5, 1.6, 1.8, 2.0, or 2.5, including any combination of any upper or lower value disclosed herein. The average pore volume may be about 0.5 ml/g, about 1.0 ml/g, about 1.5 ml/g, or about any value disclosed herein. In the embodiments of the invention, a higher pore volume requires a lower surface area, or vice-versa.

The support may comprise silica particles having an average particle size of from about 50 to 200 micrometers. The average particle size may range from a low of about 50, 70, 80, 90, or 100 to a high of about 150, 160, 180, 200 micrometers, including any combination of any upper or lower value disclosed herein.

The support may comprise agglomerates of a plurality of primary particles, the support or agglomerates preferably having an average particle size of at least 50 μm, or surface area less than 1,000 m$^2$/g, or a combination thereof. The agglomerates may be at least partially encapsulated. In an embodiment of the invention, the porous support does not comprise agglomerates.

In the case of spray dried, amorphous, hydrated-surface silica as one example, the agglomerates may typically have an overall size range of 1-300 μm (e.g., 30-200 μm), the primary particles a size range of 0.001-50 μm (e.g., 50-400 nm or 1-50 μm), and the elementary particles a size range of 1-400 nm (e.g., 5-40 nm). As used herein, "spray dried" refers to metal oxide such as silica obtained by expanding a sol in such a manner as to evaporate the liquid from the sol, e.g., by passing the silica sol through a jet or nozzle with a hot gas.

The porous support may comprise silica particles having any combination of properties disclosed herein. For example, the porous support may comprise silica particles having an average surface area of about 600 $m^2/g$ and an average pore diameter of about 90 Angstrom, or an average surface area of about 550 $m^2/g$ and an average pore diameter of about 110 Angstrom.

The combination of properties disclosed herein enables silica supports with high alumoxane loadings. For example, the alumoxane loading on the silica support may be greater than about 7, 8, 9, 9, 10, 12, 14, or 18 mmol Al/silica. The alumoxane loading may range from a low of about 7, 8, 9, 10, 11, 12, 13, 14, 15, or 16 mmol Al/g silica to a high of about 12, 14, 16, 18, or 20 mmol Al/g silica, including any combination of any upper or lower value disclosed herein.

For purposes herein, the term "alumoxane loading" is the amount of alumoxane in the supported alumoxane and unsupported alumoxane particles. When supported, the alumoxane may be within the outer or inner pores of the particles, adhered to the surface of the particles, or otherwise adhered to the particles. Alumoxane loading is reported as mmol Al/g silica.

The alumoxane loading on the silica support may also be represented or evaluated by measuring the difference between the average surface area of the particles in the raw silica (referred to herein as "raw silica surface area") and the average surface area of the particles after alumoxane has been incorporated (referred to herein as "supported alumoxane surface area"). Hence, in embodiments of the invention, the difference between the raw silica surface area and the supported alumoxane surface area may be about or less than 50%, 40%, 30%, 20%, or 10% on a volumetric basis. Both surface areas may be measured using the BET method described above.

The alumoxane loading on the silica support may also be represented or evaluated by the difference in average particle size between the raw silica (referred to herein as "raw silica particle size") and the average particle size of the supported alumoxane (referred to herein as "supported alumoxane particle size"). Hence, in embodiments of the invention, the difference between the raw silica particle size and the supported alumoxane particle size may be about or less than 50%, 40%, 30%, 20%, 20%, or 10% on a volumetric basis. Both particle sizes may be measured by the laser refraction method described above.

The formation of supported alumoxane and unsupported alumoxane particles may also be represented or evaluated by the difference of the particle sizes of the supported alumoxane and unsupported alumoxane particles. The supported alumoxane particle sizes are usually greater than a raw silica particle sizes, and alumoxane particle sizes are smaller than raw silica particle sizes. Hence, in embodiments of the invention, the difference between the supported alumoxane particle size and unsupported alumoxane particle size may be greater than 10%, 15%, 20%, 25%, 30%, 40%, 50%, 80%, 100%, 200%, 500%, 800%, 1000% on a volumetric basis.

In embodiments of the invention, the unsupported alumoxane particles can have an average particle size of from 1, 2, 3, 4, 5, 6, 8, or 10 μm up to 50, or 40, or 30, or 20, or 15, or 10, or 8, or 6, or 5 μm, for example, from 1 to 50 μm, 1 to 40 μm, from 2 to 20 μm, from 3 to 10 μm, or any combination of an upper value and a lower value as described herein.

In polymerization of polyolefins or copolymers, the catalyst systems comprising unsupported alumoxane particles can have higher activity and can result in polymers having higher molecular weight, as compared to those catalyst systems comprising supported alumoxane and little or no (e.g., 1 wt % or less, preferably 0 wt %) unsupported alumoxane particles. By controlling the ratios of supported alumoxane particles to unsupported alumoxane particles, a catalyst system can produce polyolefins of different desired molecular weight distributions.

Preferred embodiments of the catalyst system, support, activator, catalyst precursor compound, and co-activator are described in more detail below.

Support Materials:

The catalyst systems comprise porous particles as a support material to which the catalyst precursor compound and/or activator may be anchored, bound, adsorbed or the like. The support material comprises an inorganic oxide in a finely divided form. Suitable inorganic oxide materials for use in MCN catalyst systems herein include Groups 2, 4, 13, and 14 metal oxides, such as silica, alumina, magnesia, titania, zirconia, and the like, and mixtures thereof. Also, combinations of these support materials may be used, for example, silica-chromium, silica-alumina, silica-titania, and the like.

The support material comprises silica, e.g., amorphous silica, which may include a hydrated surface presenting hydroxyl or other groups, which can be deprotonated to form reactive sites to anchor activators and/or catalyst precursors. Other porous support materials may, optionally, be present with the silica as a co-support, for example, talc, other inorganic oxides, zeolites, clays, organoclays, or any other organic or inorganic support material and the like, or mixtures thereof. Silicas which may be suitable are commercially available under the trade designations PD 13054, D150-60A, P-3 and the like.

When a silica support is referred to herein, the silica support in raw form comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, i.e., the silica support comprises less than 5 wt %, 1 wt %, 0.5 wt %, 0.2 wt %, or less of any other compound.

According to some embodiments of the invention, the support material is then contacted with: 1) the activator where the support and alumoxane activator have been heated to obtain supported alumoxane and unsupported alumoxane particles (described in more detail below), 2) at least one single site catalyst precursor compound (described in more detail below), and/or 3) co-catalyst (described in more detail below), and, 4) optionally, a scavenger or co-activator (described in more detail below).

Drying of the support material can be effected according to some embodiments of the invention by heating or calcining above about 100° C., e.g., from about 100° C. to about 1,000° C., preferably at least about 200° C. The silica support may be heated to at least 130° C., about 130° C. to about 850° C., or about 200° C. to about 600° C. for a time of 1 minute to about 100 hours, e.g., from about 12 hours to about 72 hours, or from about 24 hours to about 60 hours. The calcined support material may comprise at least some groups reactive with an organometallic compound, e.g., reactive hydroxyl (OH) groups to produce the supported catalyst systems of this invention.

According to some embodiments of the invention, the support in, and/or used to prepare, the catalyst system, preferably has or comprises the following:

a) an average particle size (PS) and/or a PS mode of more than 60 μm, or more than 65 μm, or more than 70 μm, or more than 75 μm, or more than 80 μm, or more than 85 μm, or more than 90 μm, or more than 100 μm, or more than 120 μm; and/or up to 200 μm, or less than 180 μm, or less than 160 μm, or less than 150 μm, or less than 130 μm; e.g., 65-200 μm, or 80-200 μm;

b) a pore volume (PV) from at least 0.5 mL/g, or at least 0.55 mL/g, or at least 0.6 mL/g, or at least 0.65 mL/g, or at least 0.7 mL/g, or at least 0.75 mL/g; and/or up to 2.5 mL/g, or less than 2.0 mL/g, or less than 1.8 mL/g, or less than 1.6 mL/g, or less than 1.5 mL/g; e.g., 0.5-2.5 mL/g or 0.5-2 mL/g or 0.5-1.8 mL/g;

c) a specific surface area (SA) of less than 800 m$^2$/g, or less than 750 m$^2$/g, or less than 700 m$^2$/g, or less than 650 m$^2$/g; and/or more than 400 m$^2$/g, or more than 500 m$^2$/g, or more than 600 m$^2$/g, or more than 700 m$^2$/g; e.g., 400-800 m$^2$/g, or 500-750 m$^2$/g, or 600-700 m$^2$/g;

d) a mean pore diameter (PD) greater than 5 nm, greater than 6 nm, or greater than 7 nm, or greater than 8 nm, or greater than 9 nm, and/or less than 14 nm, or less than 13 nm, or less than 12 nm, or less than 11 nm, or less than 10 nm, or less than 8 nm; e.g., 5-14 nm, or 6-14 nm, or 7-14 nm, or 5-14 nm;

e) agglomerates composed of a plurality of primary particles, the primary particles having an average PS of 1 nm to less than 50 μm, or 1 μm to less than 30 μm;

f) microencapsulated agglomerates;

g) spray dried;

h) silica, e.g., amorphous silica and/or silica having a hydrated surface; and/or i) any combination or subcombination thereof.

Supportation:

The support may be treated with an organometallic compound to react with deprotonated reactive sites on the support surface. In general, the support is treated first with an organometallic activator such as MAO, and then the supported activator is treated with the metallocene compound, optional metal alkyl co-activator, although the metallocene compound and or co-activator can be loaded first, followed by contact with the other catalyst system components.

The support material, having reactive surface groups especially after calcining, may be slurried in a non-polar solvent and contacted with the organometallic compound (activator in this example), preferably dissolved in the solvent, preferably for a period of time in the range of from about 0.5 hour to about 24 hours, from about 2 hours to about 16 hours, or from about 4 hours to about 8 hours. Suitable non-polar solvents are materials in which, other than the support material and its adducts, all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from about 0° C. up to about 120° C., such as, for example: from about 20, 30, 35, 40, 45, 50, 55, or 66 up to about, 120, 100, 95, 90, 85, or 80° C., such as from 0-100° C., from 20-100° C., from 40-80° C., or any combination of an upper value and lower value described above.

In embodiments of the invention, the supported and unsupported alumoxane particles can be formed by contacting an alumoxane on a support having particles containing less than 20 vol % of the incremental pore volume comprised of pores on the support having pore diameter of greater than 200 Angstrom, at a temperature of from 0 to 100° C., for example, from 40 to 100° C. to form supported and unsupported alumoxane particles.

In some embodiments, the supported and unsupported alumoxane particles can be formed by: contacting a first alumoxane with a first support at a temperature of from –20-80° C., for example from 20-80° C. to form a first mixture, the first alumoxane being present in an amount of less than 7 mmol Al/g the first support; contacting a second alumoxane with a second support at a temperature of from 40 to 100° C., for example, from 80 to 100° C. to form a second mixture, the second alumoxane being present in an amount of greater than 7 mmol Al/g the second support; combining the first mixture and the second mixture to form supported and unsupported alumoxane particles.

The supported activator may, optionally, be treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound, e.g., hydroxyl groups on surfaces exposed by fragmentation may be reacted and thereby removed by contact of the fragments with an aluminum alkyl such as triisobutylaluminum (TIBA). Useful metal alkyls which may be used according to some embodiments of the invention to treat the support material have the general formula $R_n$-M, wherein R is $C_1$-$C_{40}$ hydrocarbyl such as $C_1$-$C_{12}$ alkyl, for example, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. Then the activator/support material is contacted with a solution of the catalyst precursor compound. In some embodiments of the invention, the supported activator is generated in situ. In alternate embodiments of the invention, the slurry of the support material is first contacted with the catalyst precursor compound for a period of time in the range of from about 0.5 hour to about 24 hours, from about 2 hours to about 16 hours, or from about 4 hours to about 8 hours, and the slurry of the supported MCN compound is then contacted with an organometallic-activator solution and/or organometallic-scavenger solution.

It is useful for the present invention to form the unsupported alumoxane particles in a controllable amount. Methods to control a desired amount of the unsupported alumoxane particles include but are not limited to:

1) Adding an excess amount of alumoxane to a support having pore diameters close to the size of the alumoxane molecule (e.g., 50-70 angstrom for MAO), and then treating with heat, e.g., at 40-120° C. In this case, the amount of supported alumoxane portion is usually fixed and the amount of unsupported alumoxane particles can be changed.
2) Combining a supported alumoxane on a conventional support, for example, Davison G948), with the unsupported alumoxane particles obtained from 1) to control the supported alumoxane amount.
3) Combining multiple supports, e.g., a 70 µm and a 150 µm silica with pore diameters close to the size of an the alumoxane molecule (e.g., 50 to 70 Angstroms for MAO), and then performing the treatment as described in 1).
4) Combining a low surface area silica with pore diameters close to the size of the alumoxane molecule (e.g., 50 to 70 Angstroms for MAO), to serve as the unsupported alumoxane promotor, with a high surface area, large size silica, e.g., >600 m$^2$/g and 150 µm, to serve as the low molecular weight component contributor, and then performing the treatment as described in 1).

It should be understood that, for forming a better supported alumoxane component, the alumoxane should be evenly distributed on the support surfaces, such as the pore surface. Therefore, for silica with a high surface area and small pores, the addition of alumoxane should be carried out under cold temperature conditions, such as −20 to 0° C. This is called the alumoxane addition temperature, which is different from the alumoxane reaction temperature or alumoxane treatment temperature or alumoxane silica contacting temperature. The alumoxane reaction temperature or alumoxane treatment temperature or alumoxane silica contacting temperature is the temperature used for treating the supported alumoxane after the alumoxane addition to the slurry of support and carrier liquid, such as toluene or hexane. For example, MAO is added to D150-60A silica at −15 to 0° C. over a period of time, e.g., 30 min, and then warmed up to ambient for a period of time, e.g., 30 min, followed by a heat treatment, e.g., 80° C. or 100° C. or 120° C., for 1 to 3 hr. This last treatment temperature is called the MAO reaction temperature or MAO treatment temperature or MAO silica contacting temperature. The MAO treatment temperature and time are two of several parameters to control the unsupported alumoxane particles formation.

Since the activity of a catalyst, reaction media (e.g., gas or slurry phase), and the reaction conditions influence the removal efficiency of the heat released by polymerization reaction in particles, to obtain the same molecular weight distribution, a highly active catalyst may require smaller particle size, less activator in use that requires a lower surface area of the support, and/or lower reactor temperature, and vise versa.

Activators:

Activators are compounds used to activate any one of the catalyst precursor compounds described above by converting the neutral catalyst precursor compound to a catalytically active catalyst compound cation. Preferred activators include alumoxane compounds, including modified alumoxane compounds.

Alumoxanes are generally oligomeric, partially hydrolyzed aluminum alkyl compounds containing —Al(R1)-O— sub-units, where R1 is an alkyl group, and may be produced by the hydrolysis of the respective trialkylaluminum compound. Examples of alumoxane activators include methylalumoxane (MAO), ethylalumoxane, butylalumoxane, isobutylalumoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different alumoxanes may also be used as the activator(s).

There are a variety of methods for preparing alumoxanes suitable for use in the present invention, non-limiting examples of which are described in U.S. Pat. Nos. 4,665,208; 4,952,540; 5,041,584; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346; EP 0 561 476; EP 0 279 586; EP 0 594-218; EP 0 586 665; WO 94/10180; and WO 99/15534; halogenated MAO are described in U.S. Pat. Nos. 7,960,488; 7,355,058; and 8,354,485; dialkylaluminum cation enhanced MAO are described in US 2013/0345376; and surface bulky group modified supported MAO are described in U.S. Pat. Nos. 8,895,465 and 9,090,720, all of which are incorporated by reference herein.

Optional Scavengers or Co-Activators:

In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds, which may be utilized as scavengers or co-activators, include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately, the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc).

Catalyst Compounds:

Single site catalyst compounds are useful herein. Typically single site catalyst compounds are transition metal containing compound that can be activated to form a 14- or 16-electron cationic metal center with at least one metal-carbon or one metal-hydrogen σ-bond.

According to some embodiments of the invention, the single-site catalyst compound may be one or more metallocenes represented by the following formula:

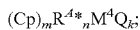

wherein each Cp is a cyclopentadienyl or a cyclopentadienyl substituted by one or more hydrocarbyl radicals having from 1 to 20 carbon atoms; $R^{A*}$ is a structural bridge between two Cp rings; $M^4$ is a transition metal selected from groups 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of $M^4$, with the proviso that if k is greater than 1, each Q may be the same or different.

According to some embodiments of the invention, the single site catalyst precursor compound is represented by the formula:

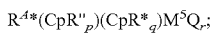

wherein each Cp is a cyclopentadienyl or substituted cyclopentadienyl ring; each R* and R" is a hydrocarbyl group having from 1 to 20 carbon atoms and may be the same or different; p is 0, 1, 2, 3, or 4; q is 1, 2, 3, or 4; $R^{A*}$ is a structural bridge between the Cp rings imparting stereorigidity to the metallocene compound; $M^5$ is a group 4, 5, or 6 metal; Q is a hydrocarbyl radical having from 1 to 20 carbon atoms or is a halogen; r is s minus 2, where s is the valence of $M^5$; wherein $(CpR^*_q)$ has bilateral or pseudobilateral symmetry; $R^*_q$ is selected, alkyl substituted indenyl, or tetra-, tri-, or dialkyl substituted cyclopentadienyl radical; and $(CpR''_p)$ contains a bulky group in one and only one of the distal positions; wherein the bulky group is of the formula $AR^W_v$; and where A is chosen from group 4 metals, oxygen, or nitrogen, and $R^W$ is a methyl radical or phenyl radical, and v is the valence of A minus 1.

According to some embodiments of the invention, the single site catalyst precursor compound is represented by the formula:

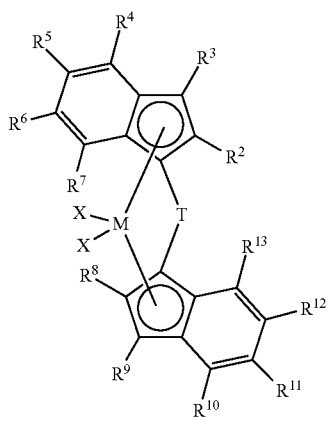

where M is a group 4, 5, or 6 metal; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —$NR'_2$, —$SR'$, —$OR'$, —$OSiR'_3$ or —$PR'_2$ radical, wherein R' is one of a halogen atom, a $C_1$-$C_{10}$ alkyl group, or a $C_6$-$C_{10}$ aryl group.

According to some embodiments of the invention, at least one of $R^2$, $R^3$, $R^4$, $R^5$, $R^6$, $R^7$, $R^8$, $R^9$, $R^{10}$, $R^{11}$, $R^{12}$, and $R^{13}$ is a cyclopropyl substituent represented by the formula:

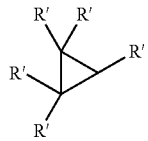

wherein each R' in the cyclopropyl substituent is, independently, hydrogen, a substituted hydrocarbyl group, an unsubstituted hydrocarbyl group, or a halogen.

According to some embodiments of the invention, the M is selected from titanium, zirconium, hafnium, vanadium, niobium, tantalum, chromium, molybdenum, and tungsten; each X is independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and substituted or unsubstituted $C_7$ to $C_{40}$ arylalkenyl groups; or, optionally, are joined together to form a $C_4$ to $C_{40}$ alkanediyl group, or a conjugated $C_4$ to $C_{40}$ diene ligand, which is coordinated to M in a metallacyclopentene fashion; or, optionally, represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with M; each $R^2$, $R^4$, $R^8$, and $R^{10}$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —$NR'_2$, —$SR'$, —$OR'$, —$SiR'_3$, —$OSiR'_3$, and —$PR'_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and $C_7$ to $C_{40}$ substituted or unsubstituted arylalkenyl groups; and T is selected from:

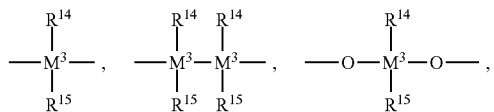

-continued

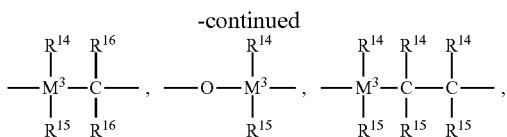

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, and —P(O)(R$^{14}$)—; wherein R$^{14}$, R$^{15}$, and R$^{16}$ are each independently selected from hydrogen, halogen, C$_1$ to C$_{20}$ alkyl groups, C$_6$ to C$_{30}$ aryl groups, C$_1$ to C$_{20}$ alkoxy groups, C$_2$ to C$_{20}$ alkenyl groups, C$_7$ to C$_{40}$ arylalkyl groups, C$_8$ to C$_{40}$ arylalkenyl groups, and C$_7$ to C$_{40}$ alkylaryl groups, optionally, R$^{14}$ and R$^{15}$, together with the atom(s) connecting them, form a ring; and M$^3$ is selected from carbon, silicon, germanium, and tin; or T is represented by the formula:

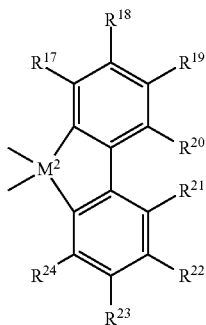

wherein R$^{17}$, R$^{18}$, R$^{19}$, R$^{20}$, R$^{21}$, R$^{22}$, R$^{23}$, and R$^{24}$ are each independently selected from hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ alkylaryl groups, substituted or unsubstituted C$_7$ to C$_{40}$ alkylaryl groups, and substituted or unsubstituted C$_8$ to C$_{40}$ arylalkenyl groups; optionally, two or more adjacent radicals R$^{17}$, R$^{18}$, R$^{19}$, R$^{20}$, R$^{21}$, R$^{22}$, R$^{23}$, and R$^{24}$, including R$^{20}$ and R$^{21}$, together with the atoms connecting them, form one or more rings; and M$^2$ represents one or more carbon atoms, or a silicon, germanium, or tin atom.

In some embodiments, two or more different catalyst compounds are present in the catalyst systems used herein. In some embodiments, two or more different catalyst systems are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. Useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

In any embodiment of the invention, in any embodiment of any formula described herein, M may be Zr or Hf.

In any embodiment of the invention, in any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and C$_1$ to C$_5$ alkyl groups, preferably each X is a methyl group.

In a preferred embodiment of the invention, in any embodiment of any formula described herein, each R$^3$, R$^5$, R$^6$, R$^7$, R$^9$, R$^{11}$, R$^{12}$, or R$^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of the invention, of any formula described herein, each R$^3$, R$^4$, R$^5$, R$^6$, R$^7$, R$^9$, R$^{10}$, R$^{11}$, R$^{12}$, or R$^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo, and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In an embodiment of the invention, in any embodiment of any formula described herein, T is a bridging group and comprises Si, Ge, or C, preferably T is dialkyl silicon or dialkyl germanium, preferably T is dimethyl silicon.

In an embodiment of the invention, in any embodiment of any formula described herein, T is a bridging group and is represented by R'$_2$C, R$_2$Si, R'$_2$Ge, R'$_2$CCR'$_2$, R'$_2$CCR'$_2$CR'$_2$, R'$_2$CCR'$_2$CR'$_2$CR'$_2$, R'C═CR', R'C═CR'CR'$_2$, R'$_2$CCR'═CR'CR'$_2$, R'C═CR'CR'═CR', R'C═CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C═CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C═CR'GeR'$_2$, WB, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'═CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'═CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'═CR', R'$_2$C—N═CR', R'$_2$C—NR'—CR'$_2$, R'$_2$C—NR'—CR'$_2$CR'$_2$, R'$_2$C—NR'—CR'═CR', R'$_2$CR'$_2$C—NR'—CR'$_2$CR'$_2$, R'$_2$C—P═CR', or R'$_2$C—PR'—CR'$_2$, where each R' is, independently, hydrogen or a C$_1$ to C$_{20}$ containing hydrocarbyl, substituted hydrocarbyl, halocarbyl, substituted halocarbyl, silylcarbyl or germylcarbyl substituent, and, optionally, two or more adjacent R' may join to form a substituted or unsubstituted, saturated, partially unsaturated or aromatic, cyclic or polycyclic substituent. Preferably, T is CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, cyclopentasilylene (Si(CH$_2$)$_4$), or Si(CH$_2$)$_5$.

In the embodiments of the invention, in any formula described herein, each R$^2$ and R$^8$, is independently, a C$_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, isopropyl, and the like.

In the embodiments of the invention, in any embodiment of any formula described herein, $R^4$ and $R^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom-containing group.

In a preferred embodiment of the invention, in any embodiment of any formula described herein, $R^2$ and $R^8$ are a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-disopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl. In a preferred embodiment, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

In the embodiments according to the present invention, suitable MCN compounds are represented by the formula (1):

$A_e MX_{n-e}$;

or the formula (1c):

$TA_2 MX_{n-2}$;

wherein: e is 1 or 2; T is a bridging group between two A groups; each A is a substituted monocyclic or polycyclic ligand that is pi-bonded to M and, optionally, includes one or more ring heteroatoms selected from boron, a group 14 atom that is not carbon, a group 15 atom, or a group 16 atom, and when e is 2, each A may be the same or different, provided that at least one A is substituted with at least one cyclopropyl substituent directly bonded to any $sp^2$ carbon atom at a bondable ring position of the ligand, wherein the cyclopropyl substituent is represented by the formula:

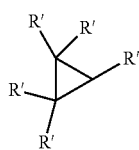

where each R' is, independently, hydrogen, a substituted or unsubstituted hydrocarbyl group, or a halogen; M is a transition metal atom having a coordination number of n and selected from group 3, 4, or 5 of the Periodic Table of Elements, or a lanthanide metal atom, or actinide metal atom; n is 3, 4, or 5; and each X is a univalent anionic ligand, or two X's are joined and bound to the metal atom to form a metallocycle ring, or two X's are joined to form a chelating ligand, a diene ligand, or an alkylidene ligand.

In the embodiments according to the present invention, the MCN compound may be represented by the formula:

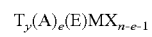
$T_y(A)_e(E)MX_{n-e-1}$ where E is $J-R''_{x-1-y}$, J is a heteroatom with a coordination number of three from group 15 or with a coordination number of two from group 16 of the Periodic Table of Elements; R'' is a $C_1-C_{100}$ substituted or unsubstituted hydrocarbyl radical; x is the coordination number of the heteroatom J where "x−1−y" indicates the number of R'' substituents bonded to J; T is a bridging group between A and E, A and E are bound to M, y is 0 or 1; and A, e, M, X, and n are as defined above.

In the embodiments according to the present invention, the MCN compound may be represented by one of the following formulae:

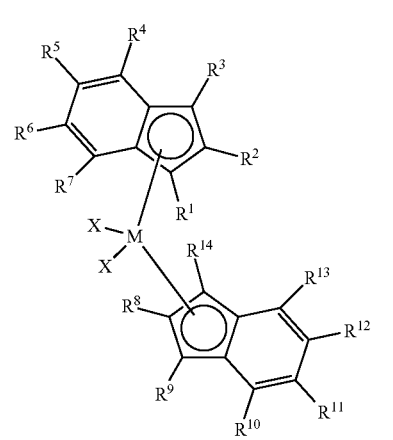

formula (1a)

or

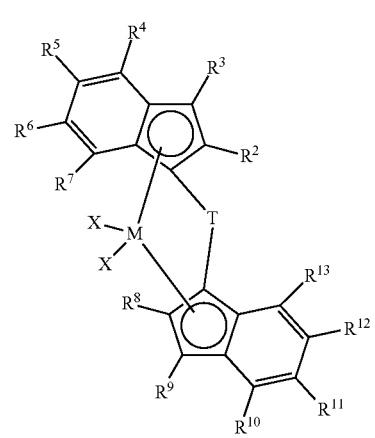

formula (1b)

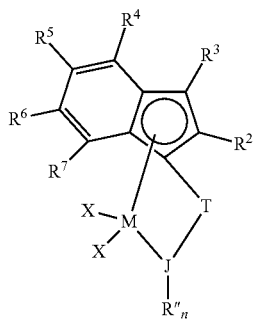

formula (2a)

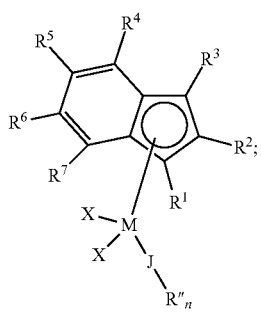

formula (2b)

where M, T, X, are as defined in claim 1; J, R", and n are as defined above, and each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is, independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent and in formula 2a and 2b at least one of $R^1$, $R^2$, $R^3$, $R^4$, $R^5$, $R^6$, or $R^7$, is a cyclopropyl substituent; and provided that any adjacent $R^1$ to $R^{14}$ groups that are not a cyclopropyl substituent, may form a fused ring or multicenter fused ring system where the rings may be aromatic, partially saturated, or saturated.

In the embodiments according to the present invention, at least one A is a monocyclic ligand selected from the group consisting of substituted or unsubstituted cyclopentadienyl, heterocyclopentadienyl, and heterophenyl ligands provided that when e is one, the monocyclic ligand is substituted with at least one cyclopropyl substituent, at least one A is a polycyclic ligand selected from the group consisting of substituted or unsubstituted indenyl, fluorenyl, cyclopenta[a]naphthyl, cyclopenta[b]naphthyl, heteropentalenyl, heterocyclopentapentalenyl, heteroindenyl, heterofluorenyl, heterocyclopentanaphthyl, heterocyclopentaindenyl, and heterobenzocyclopentaindenyl ligands.

MCN compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl) hafnium dichloride; dimethylsilylene-bis(2-methyl-4-orthobiphenylindenyl)hafnium dichloride; dimethylsilylene-bis (2-methyl-4-orthobiphenylindenyl)zirconium dichloride; dimethylsilylene-(2-cyclopropyl-4-orthobiphenylindenyl) (2-methyl-4-3',5'-di-t-butylphenylindenyl)hafnium dichloride; dimethylsilylene-(2-cyclopropyl-4-orthobiphenylindenyl) (2-methyl-4-3',5'-di-t-butylphenylindenyl)zirconium dichloride; dimethylsilylene-(2-isopropyl-4(4-t-butyl)phenyl)indenyl) (2-methyl-4-phenylindenyl) zirconium dichloride; dimethylsilylene-(2-isopropyl-4(4-t-butyl)phenyl)indenyl) (2-methyl-4-phenylindenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methylcyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

In a preferred embodiment of the invention, the molar ratio of rac to meso in the catalyst precursor compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater. In an embodiment of the invention, the MCN catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer—if any, formed. In a particular embodiment of the invention, the bridged bis(indenyl)metallocene transition metal compound formed consists essentially of the racemic isomer.

Amounts of rac and meso isomers are determined by proton NMR. $^1$H NMR data are collected at 23° C. in a 5 mm probe using a 400 MHz Bruker spectrometer with deuterated methylene chloride. (Note that if some of the examples herein use deuterated benzene, for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

In some embodiments, two or more different catalyst precursor compounds are present in the catalyst system used herein. In some embodiments, two or more different catalyst precursor compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator (as described in PCT/US2016/300036) and an alumoxane, or two different alumoxanes can be used in combination.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

In preferred embodiments of the invention, one catalyst compound is used in the polymerization, e.g., the catalyst precursor compounds present in the catalyst system are not different.

Alternately, the single-site catalyst precursor compound useful herein may represented by the formula (I):

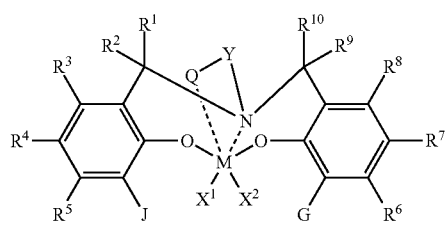

(I)

wherein M is a group 4 transition metal (preferably Hf, Zr, or Ti, preferably Hf or Zr);

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure (preferably benzyl, methyl, ethyl, chloro, bromo and the like);

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group (alternately each $R^1$, $R^2$, $R^3$, $R^4$, $R^5$, $R^6$, $R^7$, $R^8$, $R^9$, and $R^{10}$ may be a functional group comprising of elements from groups 13 to 17), or two or more of $R^1$ to $R^{10}$ may independently join together to form a $C_4$ to $C_{62}$ cyclic or polycyclic ring structure, or a combination thereof (preferably H, methyl, ethyl, propyl and the like);

Q is a neutral donor group, preferably a neutral donor group comprising at least one atom from group 15 or 16; and J is a $C_7$ to $C_{60}$ fused polycyclic (e.g. having at least 2 ring structures) group, which, optionally, comprises up to 20 atoms from groups 15 and 16, where at least one ring is aromatic and where at least one ring, which may or may not be aromatic, has at least 5 members (preferably J comprises a five-membered ring (which may be saturated or aromatic) that is fused to at least one other cyclic group and is preferably bound to the rest of the ligand through the five-membered ring);

G is, independently, as defined for J, a hydrogen, a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group.

In particular embodiments, the catalyst compound may be represented by either formula (II) or (III) below:

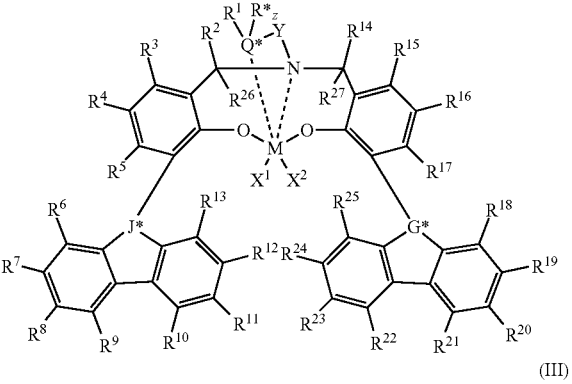

(II)

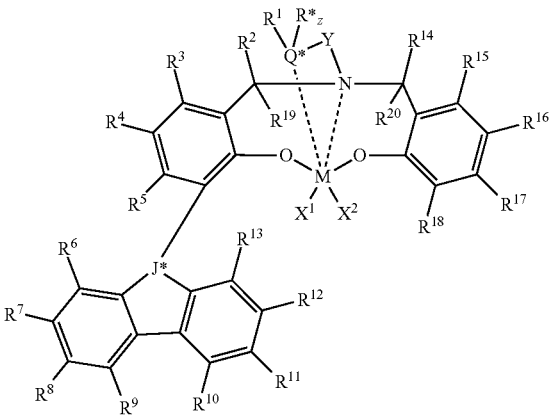

(III)

wherein M, $X^1$, $X^2$, $R^1$, $R^2$, $R^3$, $R^4$, $R^5$, $R^6$, $R^7$, $R^8$, $R^9$, $R^{10}$, and Y are as defined above with respect to formula (I);

Q* is a group 15 or 16 atom (preferably N, O, S or P);

z is 0 or 1;

J* is CR" or N;

G* is CR" or N; and each R", R*, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$ above with respect to formula (I).

In any embodiment of the transition metal complexes described herein, M may be Hf, Ti or Zr.

In any embodiment of formulas (I), (II), and (III) described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of formulas (I), (II), and (III) described herein, Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In an embodiment, Y is a divalent $C_1$ to $C_{40}$ hydrocarbyl or substituted hydrocarbyl radical comprising a portion that comprises a linker backbone comprising from 1 to 18 carbon atoms linking Q and N wherein the hydrocarbyl comprises O, S, S(O), S(O)$_2$, Si(R)$_2$, P(R), N or N(R), wherein each R is independently a C$_1$ to C$_{18}$ hydrocarbyl. In an embodiment, Y is selected from the group consisting of ethylene (—CH$_2$CH$_2$—) and 1,2-cyclohexylene. In an embodiment, Y is —CH$_2$CH$_2$CH$_2$— derived from propylene. In an embodiment, Y is selected form the group consisting of C$_1$ to C$_{20}$ alkyl groups, such as divalent methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a particular embodiment of formulas (I), (II), and (III), each R$^1$, R$^2$, R$^3$, R$^4$, R$^5$, R$^6$, R$^7$, R$^8$, R$^9$, and R$^{10}$ is, independently, a hydrogen, a C$_1$ to C$_{20}$ hydrocarbyl radical, a substituted C$_1$ to C$_{20}$ hydrocarbyl radical, or two or more of R$^1$ to R$^{10}$ may independently join together to form a C$_4$ to C$_{62}$ cyclic or polycyclic ring structure, or a combination thereof.

In any embodiment of formulas (I), (II), and (III) described herein, each R*, R'', R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, and R$^{27}$ is, independently, hydrogen, a halogen, a C$_1$ to C$_{30}$ hydrocarbyl radical, a C$_1$ to C$_{20}$ hydrocarbyl radical, or a C$_1$ to C$_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of formulas (I), (II), and (III) described herein, each R*, R'', R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, and R$^{27}$ is, independently, a substituted C$_1$ to C$_{30}$ hydrocarbyl radical, a substituted C$_1$ to C$_{20}$ hydrocarbyl radical, or a substituted C$_1$ to C$_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In an embodiment of formulas (I), (II), and (III) described herein, one or more of R*, R'', R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, and R$^{27}$ is a methyl radical, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio or a combination thereof.

In any embodiment of formulas (I), (II), and (III) described herein, Q* is N, O, S, or P, preferably N, O, or S, preferably N or O, preferably N. In any embodiment of the transition metal complexes described herein, when Q* is a group 15 atom, z is 1, and when Q* is a group 16 atom, z is 0.

In any embodiment of formulas (I), (II), and (III) described herein, Q is preferably a neutral donor group comprising at least one atom from group 15 or 16, preferably Q is NR'$_2$, OR', SR', PR'$_2$, where R' is as defined for R$^1$ (preferably R' is methyl, ethyl, propyl, isopropyl, phenyl, cyclohexyl or linked together to form a five-membered ring such as pyrrolidinyl or a six-membered ring such as piperidinyl), preferably the -(-Q-Y—)— fragment can form a substituted or unsubstituted heterocycle which may or may not be aromatic and may have multiple fused rings (for example, see compound 7-Zr, 7-Hf in the examples below). In any embodiment of formulas (I), (II), and (III) described herein, Q is preferably an amine, ether, or pyridine.

In a particular embodiment of formulas (I), (II), and (III) described herein, G* and J* are the same, preferably G* and J* are N, alternately G* and J* are CR''', where each R''' is H or a C$_1$ to C$_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tert-butylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, (triethylsilyl)methyl). In a useful embodiment of formulas (I), (II), and (III) described herein, G* and J* are different.

In a particular embodiment of formulas (I), (II), and (III) described herein, G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of formulas (I), (II), and (III) described herein, G and J are different.

In an embodiment of formulas (I), (II), and (III) described herein, M is Zr or Hf; X$^1$ and X$^2$ are benzyl radicals; R$^1$ is a methyl radical; R$^2$ through R$^{27}$ are hydrogen; Y is ethylene (—CH$_2$CH$_2$—), Q*, G* and J* are N, and Rz* is methyl radical.

In an embodiment of formulas (I), (II), and (III) described herein, M is Zr or Hf; X$^1$ and X$^2$ are benzyl radicals; R$^4$ and R$^7$ are methyl radicals; R$^1$ through R$^3$, R$^5$ through R$^6$ and R$^8$ through R$^{10}$ are hydrogen; and Y is ethylene, (—CH$_2$CH$_2$—), Q is an N-containing group, G and J are carbazolyl or fluorenyl. In a preferred combination, G and J are carbazolyl and Q is an amine group; or, G and J are substituted fluorenyl and Q is an amine, ether or pyridine.

The catalyst compound may also be represented by either formulas (IV) and (V) below:

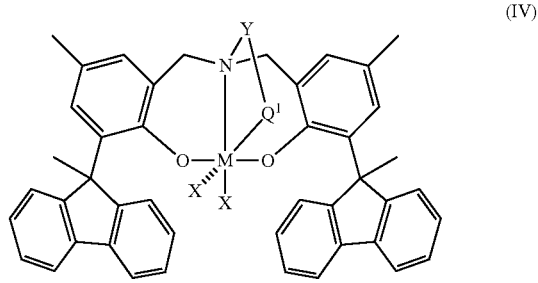

(IV)

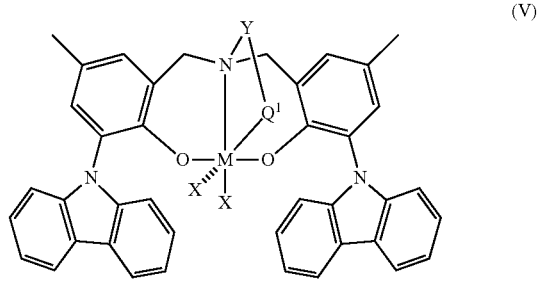

(V)

where Y is a C$_1$ to C$_3$ divalent hydrocarbyl, Q$^1$ is NR'$_2$, OR', SR', PR'$_2$, where R' is as defined for R$^1$ with respect to formulas (I), (II), and (III) above (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for X$^1$ above with respect to formulas (I), (II), and (III), preferably each X is benzyl, methyl, ethyl, chloride, bromide or alkoxide.

Chain Transfer Agents: This invention further relates to methods to polymerize olefins using the above complex in the presence of a chain transfer agent ("CTA"). The CTA can be any desirable chemical compound such as those disclosed in WO 2007/130306. Preferably, the CTA is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where di-ethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl aluminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10 or 20 or 50 or 100 equivalents to 600 or 700 or 800 or 1000 equivalents relative to the catalyst component. Alternately the CTA is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Monomers: Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. In a preferred embodiment, the monomer comprises propylene and optional comonomer(s) comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may, optionally, include heteroatoms and/or one or more functional groups. In a preferred embodiment of the invention, the monomer is propylene and no comonomer is present.

Exemplary $C_2$ to $C_{40}$ olefin monomers and, optional, comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably 300 ppm or less. In other embodiments, at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefin monomers may be selected from alpha, omega-diene monomers (i.e., di-vinyl monomers). The diolefin monomers may be linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

The polymerization or copolymerization may be carried out using olefins such as ethylene, propylene, 1-butene, 1-hexene, 4-methyl-1-pentene, and 1-octene, vinylcyclohexane, norbornene, and norbornadiene. In particular, propylene and ethylene are polymerized.

Preferably, the comonomer(s) are present in the final propylene polymer composition at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (e.g., propylene).

Polymerization:

The invention relates to polymerization processes where monomer and, optionally, comonomer are contacted with a catalyst system comprising an activator and at least one metallocene compound, as described above. The catalyst compound and activator may be combined in any order, and are combined typically prior to contacting with the monomer.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Slurry or gas polymerization processes are useful. (A homogeneous polymerization process is defined to be a process where at least 90 wt % of the product is soluble in the reaction media.) A bulk homogeneous process is also useful. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt %, based upon the weight of the solvents.

Polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and a pressure in the range of from about 0.35 MPa to about 10 MPa, preferably from about 0.45 MPa to about 6 MPa, or preferably from about 0.5 MPa to about 4 MPa.

Propylene polymer compositions, according to embodiments of the invention, may be prepared using conventional polymerization processes such as a two-stage process in two reactors or a three-stage process in three reactors, although it is also possible to produce these compositions in a single reactor. Each stage may be independently carried out in either the gas, solution, or liquid slurry phase. For example, the first stage may be conducted in the gas phase and the second in liquid slurry, or vice versa, and the, optional, third stage in gas or slurry phase. Alternatively, each phase may be the same in the various stages. Propylene polymer compositions of this invention can be produced in multiple reactors, such as two or three, operated in series, where a component is polymerized first in a gas phase, liquid slurry or solution polymerization process and another component is polymerized in a second reactor such as a gas phase or slurry phase reactor.

The stages of the processes of this invention can be carried out in any manner known in the art, in solution, in suspension or in the gas phase, continuously or batch wise, or any combination thereof, in one or more steps. The term "gas phase polymerization" refers to the state of the monomers during polymerization, where the "gas phase" refers to the vapor state of the monomers. In another embodiment, a slurry process is used in one or more stages. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase polymerization processes can be used in one or more stages.

The productivity of the catalyst system in a single stage or in all stages combined may be at least 50, 500, 800, 5,000, 10,000 or 20,000 g (polymer)/g (cat)/hour.

Polymer Products:

The processes described herein can produce a variety of polymer products, including but not limited to ethylene and propylene homopolymers and copolymers. The polymers produced may be homopolymers of ethylene or propylene or copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

The polymers may comprise polypropylene, for example, iPP, highly isotactic polypropylene, sPP, hPP, and RCP. The propylene polymer may also be heterophasic. The propylene polymer may also be an impact copolymer (ICP). The ICP comprises a blend of iPP, preferably with a $T_m$ of 120° C. or more, with a propylene polymer with a glass transition temperature ($T_g$) of −30° C. or less and/or an ethylene polymer.

In a preferred embodiment of the invention, the polymers produced herein, may have a multimodal MWD of polymer species. By multimodal MWD is meant that the GPC-4D trace has more than one peak or inflection point. In a preferred embodiment of the invention, the propylene polymer compositions produced herein, may have a bimodal MWD of polymer species. The MWD can be determined by GPC-4D.

In a preferred embodiment of the invention, the polymers produced herein, may have an Mw/Mn of at least 2.0, at least 3.0, at least 4.0, at least 5.0, at least 6.0, or at least 7.0, as determined GPC-4D (or from 2.0 to 40, or from 3.0 to 20, or from 5 to 15);

In an embodiment, a propylene polymer produced herein has:

a) at least 50 mol % propylene (or from 50 to 100 mol %, or from 60 to 97 mol %, or from 65 to 95 mol %, or from 70 to 90 mol %, or at least 90 mol %, or from 50 to 99 mol %) and optionally at least 1 mol % co-monomer (or from 1 to 50 mol %, or from 3 to 40 mol %, or from 5 to 35 mol %, or from 10 to 30 mol %) based upon the weight of the propylene polymer composition; and/or b) a 1% secant flexural modulus of at least 1000 MPa (or at least 1300 MPa, or at least 1500 MPa, or at least 1600 MPa, or at least 1800 MPa, or at least 1900 MPa, or at least 2000 MPa, or at least 2100 MPa, or at least 2200 MPa);

c) less than 200 regio defects (sum of 2,1-erythro and 2,1-threo insertions and 3,1-isomerizations) per 10,000 propylene units, as determined by $^{13}C$ NMR spectroscopy (or from 5 to 200, or from 10 to 200, or from 15 to 200, or from 17 to 175 regio defects per 10,000 propylene units, alternatively more than 5, or 10, or 20, or 30, or 40, but less than 200 regio defects, alternatively less than 150 regio defects per 10,000 propylene units); and/or d) a porosity greater than or equal to about 15%, based on the total volume of the propylene polymer base resin or matrix, determined by mercury infiltration porosimetry (or greater than or equal to 20, 25, 30, 35, 40, 45%, up to about 50, 60, 70, 80 or 85% or higher); and/or e) a median PD as determined by mercury intrusion porosimetry of less than 165 µm or less than 160 µm (or from 1, or 2, or 5, or 10 µm up to 50, or 60, or 70, or 80, or 90, or 100, or 120, or 125, or 150, or 160, or 165 µm); and/or f) an Mw/Mn of at least 2, at least 3, at least 4, or at least 5, as determined GPC-4D (or from 5 to 40, or from 6 to 20, or from 7 to 15); and/or g) a melt flow rate of 50 dg/min or more, as determined by ASTM D1238, 230° C., 2.16 kg (or 60 dg/min or more, or 75 dg/min or more); and/or h) a multimodal Mw/Mn, as determined by GPC-4D, particularly the composition produced after stage A and stage B (the combined A&B components), or (ii) an Mw/Mn of greater than 1 to 5 (alternately 1.1 to 3, alternately 1.3 to 2.5), particularly the composition produced after stage A;

i) a multimodal PSD; and/or j) if co-monomer is present, a CDBI of 50% or more (or 60% or more, alternately 70% or more, alternately 80% or more, alternately 90% or more, alternately 95% or more).

In any embodiment described herein, propylene copolymer composition may have a melting point (Tm, DSC peak second melt) from at least 100° C. to about 175° C., about 105° C. to about 170° C., about 110° C. to about 165° C., or about 115° C. to about 155° C., and a crystallization point (Tc, DSC peak second melt) of 115° C. or more, preferably from at least 100° C. to about 150° C., about 105° C. to about 130° C., about 110° C. to about 125° C., or about 115° C. to about 125° C.

The polymer produced herein may be combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

EXPERIMENTAL

All reactions were carried out under a purified nitrogen atmosphere using standard glovebox, high vacuum or Schlenk techniques, in a CELSTIR reactor unless otherwise noted. All solvents used were anhydrous, de-oxygenated and purified according to known procedures. All starting materials were either purchased from Aldrich and purified prior to use or prepared according to procedures known to those skilled in the art. Silicas were obtained from the Asahi Glass Co., Ltd. or AGC Chemicals Americas, Inc. (D70-120A and D150-60A), PQ Corporation (PD™ 14024), Fuji Silysia Chemical LTD (CARiACT™ P-3), and Davison Chemical Division of W.R. Grace and Company (G 948). Methylaluminoxane (MAO) was obtained as a 30 wt % MAO in toluene solution from Albemarle (13.5 wt % Al or 5.0 mmol/g). The metallocene used for the preparation of catalysts Cat1 to Cat5 in Table 2 was rac-dimethylsilyl bis(2-cyclopropyl-4-(3',5'-di-tert-butyl-phenyl)-indenyl) zirconium dichloride (MCN1) and the metallocene used for the preparation of catalysts Cat6 and Cat7 in Table 5 was rac-dimethylsilyl bis(2-methyl-4-(3',5'-di-tert-butyl-4'-methoxy-phenyl)-indenyl) zirconium dichloride (MCN2).

Melt Flow Rate (MFR):

MFR was measured as per ASTM D1238, condition L, at 230° C. and 2.16 kg load unless otherwise indicated.

Secant Flexural Modulus:

The 1% secant flexural modulus (1% SFM) was measured using a ISO 37-Type 3 bar, with a crosshead speed of 1.0 mm/min and a support span of 30.0 mm using an Instron machine according to ASTM D790 (A, 1.0 mm/min).

Xylene Extraction of EP Rubber from ICP:

Inside a dry box, in a 100 mL round bottom flask with a stir bar, 5 gm of polymer and 50 gm xylene were weighed into the flask. Heated it in an oil bath set to 130° C. When temperature reached to 130° C., allowed to heat for an additional 30 mins or until all polymers were completely dissolved. Then cooled down the flask to room temperature and kept it undisturbed overnight, and brought the flask into a hood. Using a filter funnel, filtered the jelly like material. Washed it with xylene 3×30 mL. Collected both filtrate and solid, respectively. Slurry solid material with hexanes and purge it with air or nitrogen to dry to constant weight to obtain the weight of iPP. Use a rotary evaporator to evaporate the solvent from filtrate to obtain a thick viscous liquid and dissolve it with hexane and purge it with air or nitrogen to constant weight to obtain the weight of rubber. The rubber samples from three were analyzed with GPC-4D to obtain rubber molecular weight data, which are listed in Table 2.

GPC-4D Analysis for Molecular Weight Determination:

The moments of molecular weight (Mw, Mn, Mw/Mn, etc.) and the comonomer content (C2, C3, C6, etc.), were determined with using GPC-4D using a high temperature Gel Permeation Chromatograph (PolymerChar™ GPC-IR) equipped with a multiple-channel band filter based Infrared detector ensemble IR5, in which a broad-band channel is used to measure the polymer concentration while two narrow-band channels are used for characterizing composition. Three Agilent PLgel 10 µm Mixed-B LS columns are used to provide polymer separation. Reagent grade 1,2,4-trichlorobenzene (TCB) with 300 ppm antioxidant butylated hydroxytoluene (BHT) was used as the mobile phase. The TCB mixture was filtered through a 0.1 µm Teflon filter and degassed with an online degasser before entering the GPC instrument. The nominal flow rate was 1.0 mL/min and the nominal injection volume was 200 µL. The whole system including transfer lines, columns, detectors were contained in an oven maintained at 145° C. Given amount of polymer sample was weighed and sealed in a standard vial with 80 µL flow marker (heptane) added to it. After loading the vial in the autosampler, polymer was automatically dissolved in the instrument with 8 mL added TCB solvent. The polymer was dissolved at 160° C. with continuous shaking for about 1 to 2 hours. The TCB densities used in concentration calculation are 1.463 g/ml at room temperature and 1.284 g/ml at 145° C. The sample solution concentration was from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I$$

where α is the mass constant determined with PE or PP standards. The mass recovery is calculated from the ratio of the integrated area of the concentration chromatography over elution volume and the injection mass which is equal to the predetermined concentration multiplied by injection loop volume.

The molecular weight is determined by combining universal calibration relationship with the column calibration which is performed with a series of monodispersed polystyrene (PS) standards. The MW is calculated at each elution volume with following equation.

$$\log M_X = \frac{\log(K_{PS}/K_X)}{a_X + 1} + \frac{a_{PS} + 1}{a_X + 1} \log M_{PS}$$

where the variables with subscript "X" stand for the test sample while those with subscript "PS" stand for PS. In this method, $a_{PS}$=0.67 and $K_{PS}$=0.000175 while $a_x$ and $K_x$ are obtained from published literature. Specifically, a/K=0.695/0.000579 for PE and 0.705/0.0002288 for PP.

The comonomer composition is determined by the ratio of the IR detector intensity corresponding to $CH_2$ and $CH_3$ channel calibrated with a series of PE and PP homo/copolymer standards whose nominal value are predetermined by NMR.

Al, Si Elemental Mapping:

Al and Si mapping was performed using a Zeiss EVO VP-SEM, available from Zeiss USA, New York, US, equipped with Oxford EDS X-Max detectors and operated at 20 kV (accelerating voltage), 1 nA (sample current), and 50 Pa (chamber pressure in Variable Pressure mode).

EXAMPLES

Calcination of Raw Silica:

Raw silica was calcined in a CARBOLITE Model VST 12/600 tube furnace using a EUROTHERM 3216P1 temperature controller, according to the following procedure. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hours to allow complete calcination and removal of water or moisture. After the dehydration was complete, the quartz tube was cooled to ambient temperature. Calcined silica was recovered in a silica catcher, and collected into a glass container inside a dry box. Diffuse reflectance infrared Fourier transform spectroscopy (DRIFTS) was used as a quality control check. Different silicas used in the following examples and their calcination conditions are listed in Table 1.

TABLE 1

Silica Properties and Calcination Temperatures

| Entry | Support | Calcination Temp. (° C.) | Avg. Pore size (μm)* | Pore Diameter (Å)* | Surface Area BET ($m^2$/g)* | Pore Volume (mL/g)* |
|---|---|---|---|---|---|---|
| IS-1a | D150-60A | 600 | 150 | 64 | 733 | 1.17 |
| IS-1b | D150-60A | 200 | 150 | 64 | 733 | 1.17 |
| IS-2 | PD 13054 | 200 | 130 | 66 | 671 | 1.11 |
| IS-3 | P-3 | 200 | 33 | 66 | 690 | 1.13 |
| CS-1 | D70-120A | 200 | 70 | 146 | 450 | 1.64 |
| CS-2 | PD 14024 | 200 | 85 | 92 | 611 | 1.40 |
| CS-3 | G948 | 600 | 58 | 242 | 278 | 1.68 |

*values from manufacturer

Table 1 lists IS-1 to IS-3 silicas as inventive examples with pore diameters of 70 Angstroms or less, and silicas CS-1 to CS-3 as comparative examples with pore diameters of more than 70 Angstroms.

Reaction of Silica with MAO: Control of Unsupported MAO Particle Formation:

All small pore silicas listed in Table 1 having pore diameters of less than 70 Angstroms, if reacting with MAO, can promote formation of unsupported MAO particles, with the amount controllable by manipulating MAO concentration and MAO reaction temperature. These silica are cooled to less than 5° C. (preferably less than 0° C.), during the MAO addition to a support slurry to prevent MAO blockage of small pores and to form a supported MAO portion with more evenly distributed MAO. Dilution of silica slurry can also assist in heat removal to limit MAO blockage, e.g., 10:1 weight ratio of solvent:silica vs. regular 4-5:1 is useful. The MAO addition temperature (when mixed with the silica slurry) is labeled as T1 and the addition time (e.g., time the MAO is slowly added to the slurry) is labeled as t1 as shown in Table 2. Unsupported MAO particles can form with increased MAO concentrations in the slurry and higher heat applied in the step of "MAO reaction", which is defined as the heat treatment after the MAO addition, with the reaction temperature labeled as T2 and the reaction time labeled as t2 as shown in Table 2. For example, a slurry of D150-60A silica and toluene was combined slowly with MAO (7.0 mmol Al/g silica) that had been cooled to −5 to 0° C. over a period of 30 minutes at ambient temperature. The Mixture was then allowed to react for 3 hours at 20° C. (Table 2 Example 4). Thereafter, the mixture was combined with catalyst compound as described below.

TABLE 2

Catalyst Preparation Conditions

| Example | Catalyst | Silica | MCN | MAO (mmol Al/g silica) | MAO Addition T1 (° C.) | MAO Addition t1 (min) | MAO Reaction T2 (° C.) | MAO Reaction t2 (hr) | $Zr^f$ (wt %) |
|---|---|---|---|---|---|---|---|---|---|
| 1 | Cat1A | IS-1b | MCN1 | 9.5 | −5-0 | 30 | 80 | 1 | 0.16 |
| 2 | Cat 1B | IS-1b | MCN1 | 9.5 | −5-0 | 30 | 80 | 1 | 0.16 |
| 3 | Cat 2 | IS-1b | MCN1 | 11.5 | −5-0 | 30 | 100 | 3 | 0.16 |
| 4 | Cat 3 | IS-1a | MCN1 | 7.0 | −5-0 | 30 | 20 | 3 | 0.16 |
| 5 | Cat 4 | CS-3 | MCN1 | 9.5 | 20 | 15 | 100 | 3 | 0.16 |
| 6 | Cat 5 | IS-1b | MCN1 | 11.5 | −5-0 | 30 | 80 | 1 | 0.16 |
| 8 | sMAO | IS-3 | $NA^g$ | 13.0 | −5-0 | 30 | 100 | 3 | $NA^g$ |

$^f$metallocene charge as Zr wt % based on supported MAO;
$^g$Only sMAO was made.

Catalyst Preparation

Catalysts were prepared by the following procedure: 125 mL-500 mL Cel-Stir reactors equipped with mechanical stirrers were used to prepare catalysts from 1 g to 20 g scales. Silica was slurried in toluene at a 1:5 weight ratio except for Example 4 in Table 2 that used 1:10 weight ratio.

A drybox freezer was used to cool both silica toluene slurry and MAO 30% toluene solution, and during addition of MAO, the temperature of the slurry was maintained lower than about 0° C., except for Example 5 in Table 2 that was performed at ambient temperature. MAO amounts based on mmol Al/g silica used for catalyst preparation are listed in Table 2. After the MAO addition to the silica slurry, the resulting mixture was allowed to stir at ambient for 30 min, and then the mixture was heated to desired temperatures listed in Table 2 and maintained at that temperature for a desired period of time listed in Table 2. The mixture was then allowed to cool to ambient and, except for the preparation of Examples 5 and 7, TIBAL was added to the mixture in an amounts based on 0.5 mmol Al/g solid and the mixture was stirred for 30 min. The amount of metallocene compound based on Zr wt % charge listed in Table 2 was added as solid at once and stirred for 1-2 hr. Then the mixture was filtered, washed with solvents based on 10:1 of solvent to solid catalyst weight ratio three times, first two times with toluene and third time with hexane or pentane, and then dried under vacuum to constant weight.

Catalyst Cat 1A-Cat 1B Preparation:

Cat 1A and 1B in Example 1 and 2 of Table 2 were prepared according to the Catalyst Preparation procedure above and then sieved through a 90 μm screen to create a supported MAO particles dominated catalyst (Cat 1A, approx. 10:90 ratio of unsupported:supported) and an unsupported MAO particle dominated catalyst (Cat 1B, approx 90:10 ratio of unsupported:supported), which were used to generate the data in Table 4 Examples 12 and 13.

Catalyst Cat 6 Preparation:

To produce polymer with observable, controlled multimodal molecular weight distribution, the catalyst solid obtained from the preparation conditions in Example 7 of Table 2 was sieved through a 90 and a 53 μm screen to obtain an unsupported MAO particle dominated <50 μm particle portion and a supported MAO particle dominated >90 μm particle portion. Then we mixed 10 weight portions of the supported MAO dominated particles (>90 μm) and 1 weight portion of the unsupported MAO dominated catalyst particles (<50 μm) to form Catalyst Cat 6, Example 7 in Table 2.

Catalyst Cat7 was prepared using same procedure as Cat2 in Example 3/Table 2 except that MCN 2 was used instead of MCN1.

Catalyst Cat8 was prepared using same procedure as Cat3 as Example 4 in Table 2 except that MCN 2 was used instead of MCN1.

Identification of Unsupported MAO Formation by SEM Si, Al Elemental Mapping

General sample preparation for SEM elemental mapping: a mixture containing about 300 mg of supported MAO particles and unsupported MAO particles was placed in a 4 mL vial in the drybox and was loosely capped and brought outside the drybox to slowly decompose in the air for overnight. The surface area and pore distribution for the decomposed sample were obtained and compared to the sample before decomposition, both analyzed with a Micromeritics ASAP 2420 Surface Area and Porosity Analyzer through the standard BET method. The results indicated that the two samples are very similar in terms of surface area and pore structures, indicating no significant structure changes after controlled decomposition.

Example 3 Cat 2 and Example 8 sMAO in Table 2 were analyzed with SEM Al, Si elemental mapping. The results are shown in FIG. 1 and FIG. 2, respectively, which show aluminum only particles, indicating the formation of unsupported MAO particles.

Procedure: IPP and ICP Polymerization (iPP Matrix Phase and EP Rubber Fill Phase)

1) Catalyst slurry preparation: Solid catalyst was mixed well with degased mineral oil as 5% slurry.

2) iPP polymerization: In the dry box, to a cat tube was charged 2.0013 g of catalyst slurry, followed by 1 ml hexane (N2 sparged and sieve purified), and to a 3 mL syringe was charge 1.0 ml TNOAL hexane solution (neat tri-n-octylaluminum 5 ml+100 ml hexane). The catalyst tube was attached to a 2 L reactor while the reactor was being purged with nitrogen. The TNOAL solution was injected into the reactor via the scavenger port capped with a rubber septum. 1,000 ml of propylene was introduced to the reactor through a purified propylene line. The agitator was brought to 500 rpm. The mixture was allowed to mix for 5 minutes at ambient temperature. The catalyst slurry in the catalyst tube was then flushed into the reactor with 250 ml propylene. The polymerization reaction was allowed to run for 5 minutes at ambient temperature.

3) iPP Polymerization: The temperature was then increased to 70° C. and, if $H_2$ was required (e.g., Examples 12 and 13 of Table 4), a desired pressure $H_2$ listed in the Table below in a 150 mL bomb was introduced into the reactor. The reaction was allowed to run for 50 minutes after the temperature reached to 70° C. If only iPP was obtained, skip step 4) and go to step 5) e.g., Examples 12 and 13 of Table 4.

4) ICP Polymerization: at 1 minute less than the time mark for iPP polymerization, e.g., 29 min for a 30 min iPP run, the agitator was set to 250 rpm. At the iPP time mark, e.g., 30 min, using the reactor vent block valve, the reactor pressure was vented to 214 psig, while maintaining reactor temperature as close as possible to 70° C. The agitator was increased to 500 rpm. The reactor temperature was stabilized at 70° C. with the reactor pressure kept at 214 psig. Then 136 psig of ethylene was introduced, via gas phase, targeting a desired total $C_3$ and $C_2$ pressure of 350 psig. The reactor was kept under that pressure for 20 minutes.

5) Ending of Polymerization: Using reactor vent block valve, the reactor was quickly vented to stop the polymerization. The polymer produced was collected and dried overnight. The product was subjected to xylene extraction to obtain the EPR and tested for Mw. The data are reported below.

Catalysts Cat3, Cat6, and Cat9 were used to prepare isotactic polypropylene following steps 1, 2, 3 and 5 above (Examples 9, 10, and 11). The data are reported in Table 3.

TABLE 3 iPP Produced in Two Stage iPP Polymerization

| Example/ Catalyst | MAO charge (mmol/g SiO$_2$) | sMAO RXN (° C., hr) | iPP Polymerization H$_2$ (psi) | t (min) | Activity (g/g cat/hr) | iPP particle size ratio >70A/<70A |
|---|---|---|---|---|---|---|
| 9/Cat3 | 7.0 | 25, 3 | 0/30 | 50/10 | 1,443 | 90/10 |
| 10/Cat6 | 11.5 | 80, 1 | 0/30 | 50/10 | 3,270 | 65/35 |
| 11/Cat 2 | 11.5 | 100, 3 | 0/30 | 50/5 | 3,097 | 20/80 |

Catalysts Cat1A and Cat1B were used to prepare isotactic polypropylene following steps 1, 2, 3 and 5 above (Examples 12 and 13). The data are reported in Table 4A.

TABLE 4A

| iPP Ex. | Catalyst, PS (µm) | Silica | iPP polymerization Activity (g/g cat/hr) | H$_2$ (psi) | T (° C.) | T (min) | MFR (g/10 min) | Mw (kg/mol) | Stiffness (1% sec) |
|---|---|---|---|---|---|---|---|---|---|
| 12 | Cat 1A**, >90 | IS-1b | 315 | 10 | 70 | 50 | 813.7 | 119 | 1,087 |
| 13 | Cat 1B**, <90 | | 3,558 | 10 | 70 | 50 | 13.9 | 256 | 1,523 |

**sieved to obtain indicated particle size.

Catalysts Cat4 and Cat1B were used to prepare impact copolymers following steps 1, 2, 3, 4, and 5 above (Examples 14 and 15). The data are reported in Table 4B.

TABLE 4B

| ICP Ex. | Catalyst, PS (µm) | Silica | ICP Polymerization at 70° C. Activity (g/g cat/hr) | iPP H$_2$/t (psi/min) | EP C3:C2/t (psi:psi/min) | MFR (g/10 min) | Mw (kg/mol) | ER Rubber (wt %) |
|---|---|---|---|---|---|---|---|---|
| 14 | Cat 1B**, <90 | IS-1b | 2,797* | 0/ | 136:214/20 | 22.4 | 258 | 27.2 |
| 15 | Cat 4, 58 | CS-3 | 2,710* | 0/ | 136:214/20 | 54.4 | 157 | 32.6 |

*granule agglomerated because of high rubber content,
**sieved to obtain indicated particle size.

Examples 12 and 13 in Table 4A show significant molecular weight differences for homopolymers derived from catalyst systems having a majority of MAO supported silica (Cat1A) versus catalyst systems having a majority of unsupported MAO particles (Cat1B). It can be seen that polymer made from Cat1B has an Mw almost 140 k higher than polymer made with Cat1A. The activities are also very different, showing Cat1B about 10 times more active than Cat1A.

Catalysts Cat7 and Cat8 were used to prepare isotactic polypropylene following steps 1, 2, 3 and 5 above (Examples 17 and 18). The data are reported in Table 5.

TABLE 5 iPP Polymers Obtained From MCN 2

| iPP Ex. | Catalyst | Silica | iPP polymerization Activity (g/g cat/hr) | H$_2$ (psi) | T (° C.) | T (min) | MFR (g/10 min) | Mw (kg/mol) | Stiffness (1% sec) |
|---|---|---|---|---|---|---|---|---|---|
| 17 | Cat7 | IS-1a | 2,467 | 0 | 70 | 50 | 0.19 | 791 | 1,712 |
| 18 | Cat8 | IS-1b | 317 | | | | 0.04 | 895 | 1,391 |

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "con-

What is claimed is:

1. A catalyst system comprising catalyst compound, silica support and alumoxane activator, where part of the alumoxane is present on the support, supported alumoxane, and part of the alumoxane is not associated with the support, unsupported alumoxane,
wherein:
i) the support comprises silica particles having, prior to combination with the alumoxane, an average surface area of greater than about 400 m²/g and an average pore diameter of less than about 70 Angstroms;
ii) alumoxane is present on the support in an amount of less than 7 mmol Al/g silica; and
iii) the catalyst system comprises at least 1 wt % of unsupported alumoxane particles, based upon the weight of the catalyst system.

2. The catalyst system of claim 1, wherein the silica support, prior to combination with the alumoxane, has an average particle size of 50 μm or more.

3. The catalyst system of claim 1, wherein the silica support, prior to combination with the alumoxane, has an average surface area of from 450 to 800 m²/g.

4. The catalyst system of claim 1, wherein the silica support, prior to combination with the alumoxane, has an average pore diameter of from 50 to 70 Angstrom.

5. The catalyst system of claim 1, wherein the silica support, prior to combination with the alumoxane, has an average pore volume of from about 0.5 to 2.5 ml/g of silica.

6. The catalyst system of claim 1, wherein the weight ratio of the supported alumoxane to the unsupported alumoxane is from about 1:1 to 1:15.

7. The catalyst system of claim 1, wherein the unsupported alumoxane particles have an average particle size of 2 to 20 μm.

8. The catalyst system of claim 1, wherein the unsupported alumoxane particles have a surface area differing by 10% or more from the surface area of the supported alumoxane particles.

9. The catalyst system of claim 1, wherein the alumoxane comprises methylalumoxane.

10. The catalyst system of claim 1, wherein the support is spray dried.

11. The catalyst system of claim 1, further comprising a co-activator selected from the group consisting of: trialkylaluminum, dialkylaluminum halide, dialkylaluminum alkoxide, dialkylmagnesium, alkylmagnesium halide, dialkylzinc, or any combination thereof.

12. The catalyst system of claim 1, wherein the catalyst compound is selected from precursor compounds I or II;
wherein precursor compound I is represented by the following formula:

$(Cp)_m R^{A*}{}_n M^4 Q_k$ (I)

wherein:
each Cp is a cyclopentadienyl, indenyl, or fluorenyl moiety substituted by one or more hydrocarbyl radicals having from 1 to 20 carbon atoms;
$R^{A*}$ is a bridge between two Cp moieties;
$M^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp is optionally the same or different;
n is 0 or 1, with the proviso that n=0 if m=1; and
k is such that k+m is equal to the oxidation state of $M^4$, with the proviso that if k is greater than 1, each Q is optionally the same or different; and
wherein precursor compound II is represented by the following formula:

$R^{A*}(CpR''_p)(CpR^*{}_q)M^5 Q_r$ (II)

wherein:
each Cp is a cyclopentadienyl moiety or substituted cyclopentadienyl moiety;
each R* and R" is a hydrocarbyl group having from 1 to 20 carbon atoms and is the same or different;
p is 0, 1, 2, 3, or 4;
q is 1, 2, 3, or 4;
$R^{A*}$ is a structural bridge between the Cp moieties imparting stereorigidity to the metallocene compound;
$M^5$ is a group 4, 5, or 6 metal;
Q is a hydrocarbyl radical having 1 to 20 carbon atoms or is a halogen;
r is s minus 2, where s is the valence of $M^5$;
wherein $(CpR^*{}_q)$ has bilateral or pseudobilateral symmetry; $R^*{}_q$ is selected such that $(CpR^*{}_q)$ forms a fluorenyl, alkyl substituted indenyl, or tetra-, tri-, or dialkyl substituted cyclopentadienyl radical; and $(CpR''_p)$ contains a bulky group in one and only one of the distal positions;
wherein the bulky group is of the formula $AR^W{}_V$; and
where A is chosen from group 4 metals, oxygen, or nitrogen, and $R^W$ is a methyl radical or phenyl radical, and v is the valence of A minus 1.

13. The catalyst system of claim 1, wherein the catalyst compound is represented by the formula:

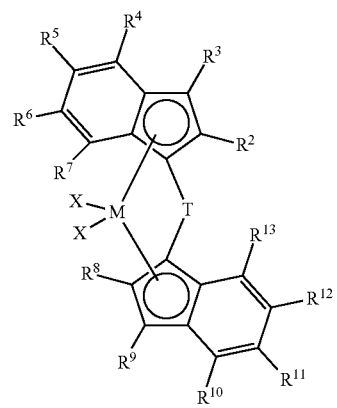

where:
M is a group 4, 5, or 6 metal;
T is a bridging group;
each X is, independently, an anionic leaving group;
each $R^2$, $R^3$, $R^4$, $R^5$, $R^6$, $R^7$, $R^8$, $R^9$, $R^{10}$, $R^{11}$, $R^{12}$, and R13 is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

14. The catalyst system of claim 1, where the catalyst compound is represented by the formula:

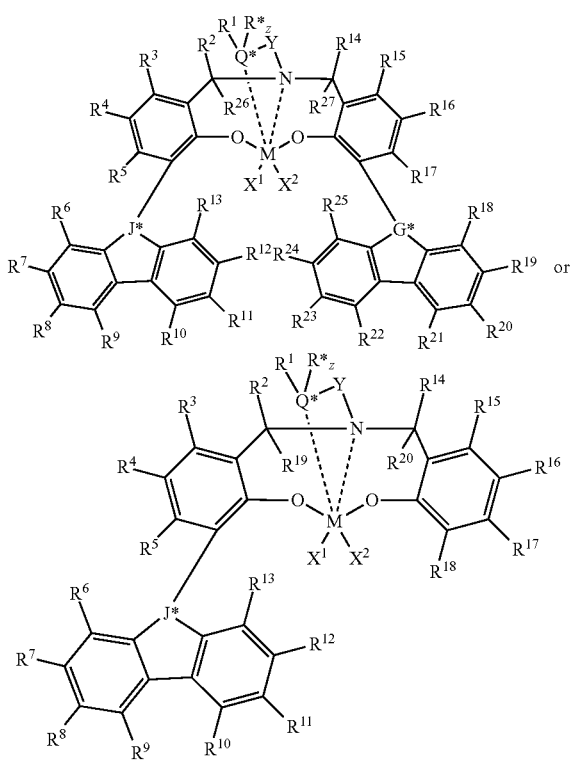

M is a group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;

Y is a divalent $C_1$ to $C_{20}$ hydrocarbyl or a substituted divalent hydrocarbyl group;

J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;

G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group Q* is a group 15 or 16 atom;
z is 0 or 1;
J* is CR'' or N;
G* is CR'' or N; and
each R'', R*, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$.

15. The catalyst system of claim 1, where the catalyst compound is represented by the formula:

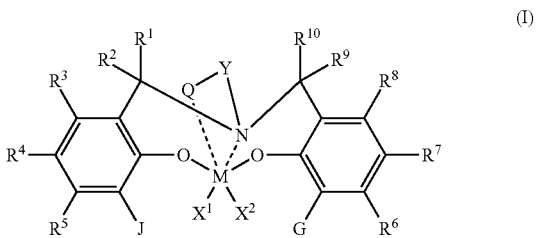

(I)

wherein M is a group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;

Q is a neutral donor group; and

J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;

G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group.

16. The catalyst system of claim 1, wherein one catalyst compound is present in the catalyst system.

17. A method to produce olefin polymer comprising contacting the catalyst system of claim 1 with olefin monomer and optional comonomer and obtaining polymer having a multimodal Mw/Mn or an Mw/Mn over 3.0.

18. The method of claim 17, wherein the monomers comprise ethylene and or propylene.

19. The method of claim 17, wherein the method is a gas phase and/or slurry process occurring in a single reactor.

20. A process of making a catalyst system, the process comprising:

(a) providing a support, wherein the support comprises silica particles having, prior to combination with the alumoxane, an average surface area of greater than about 400 m²/g and an average pore diameter of less than about 70 Angstroms;

(b) contacting alumoxane and the support at a temperature of from 0 to 120° C. to form particles of alumoxane on the support, supported alumoxane, and particles of the alumoxane not associated with the support, unsupported alumoxane, wherein alumoxane is present on the support in an amount of less than 7 mmol Al/g silica, and the catalyst system comprises at least 1 wt % of unsupported alumoxane particles, based upon the weight of the catalyst system; and (c) contacting the supported alumoxane and unsupported alumoxane particles with a single site catalyst precursor compound to form the catalyst system.

21. The process of claim 20, wherein the contacting in step (b) is carried out at a temperature from 0 to 100° C.

22. The process of claim 20, further comprising:
(a) contacting a first alumoxane with a first support at a temperature of from −20 to 80° C. to form a first mixture;
(b) contacting a second alumoxane with a second support at a temperature of from 40 to 120° C. to form a second mixture, where more than 7 mmol Al/g support is added to the second mixture, the second alumoxane being present on the support in an amount of less than 7 mmol Al/g on the second support and unsupported alumoxane particles;
(c) combining the first mixture and the second mixture to form a third mixture of supported alumoxane and unsupported alumoxane particles;
(d) contacting a single site catalyst precursor compound with the third mixture to form the catalyst system;
wherein the second supports comprises particles having:
an average surface area of greater than about 400 m²/g, an average pore diameter of less than about 70 Angstroms, and wherein at least 1 wt % of alumoxane particles not associated with the support are present in the catalyst system, based upon the weight of the catalyst system.

23. The process of claim 22, wherein the contacting of (a) is carried out at −5 to 40° C., and the contacting of (b) is carried out at 80-100° C.

24. The process of claim 22, wherein the first alumoxane is the same as the second alumoxane.

25. The process of claim 20, wherein the process produces a catalyst system comprising catalyst compound, silica support and alumoxane activator, where part of the alumoxane is present on the support, supported alumoxane, and part of the alumoxane is not associated with the support, unsupported alumoxane,
wherein:
i) the support comprises silica particles having, prior to combination with the alumoxane, an average surface area of greater than about 400 m²/g and an average pore diameter of less than about 70 Angstroms;
ii) alumoxane is present on the support in an amount of less than 7 mmol Al/g silica; and
iii) the catalyst system comprises at least 1 wt % of unsupported alumoxane particles, based upon the weight of the catalyst system.

26. The method of claim 17, wherein the silica support, prior to combination with the alumoxane, has an average particle size of 50 µm or more.

27. The method of claim 17, wherein the silica support, prior to combination with the alumoxane, has an average surface area of from 450 to 800 m²/g.

28. The method of claim 17, wherein the silica support, prior to combination with the alumoxane, has an average pore diameter of from 50 to 70 Angstrom.

29. The method of claim 17, wherein the silica support, prior to combination with the alumoxane, has an average pore volume of from about 0.5 to 2.5 ml/g of silica.

30. The method of claim 17, wherein the weight ratio of the supported alumoxane to the unsupported alumoxane is from about 1:1 to 1:15.

31. The method of claim 17, wherein the unsupported alumoxane particles have an average particle size of 2 to 20 µm.

32. The method of claim 17, wherein the unsupported alumoxane particles have a surface area differing by 10% or more from the surface area of the supported alumoxane particles.

33. The method of claim 17, wherein the support is spray dried.

34. The method of claim 17, wherein the single site catalyst precursor compound is selected from precursor compounds I and II;
wherein precursor compound I is represented by the following formula:

$$(Cp)_m R^{4*}{}_n M^4 Q_k \qquad (I)$$

wherein:
each Cp is a cyclopentadienyl, indenyl, or fluorenyl moiety substituted by one or more hydrocarbyl radicals having from 1 to 20 carbon atoms;
$R^{4*}$ is a bridge between two Cp moieties;
$M^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp is the same or different;
n is 0 or 1, with the proviso that n=0 if m=1; and
k is such that k+m is equal to the oxidation state of $M^4$, with the proviso that if k is greater than 1, each Q is the same or different; and
wherein precursor compound II is represented by the following formula:

$$R^{4*}(CpR''_p)(CpR^*_q)M^5 Q_r \qquad (II)$$

wherein:
each Cp is a cyclopentadienyl moiety or substituted cyclopentadienyl moiety;
each R* and R" is a hydrocarbyl group having from 1 to 20 carbon atoms and is the same or different;
p is 0, 1, 2, 3, or 4;
q is 1, 2, 3, or 4;
$R^{4*}$ is a structural bridge between the Cp moieties imparting stereorigidity to the metallocene compound;
$M^5$ is a group 4, 5, or 6 metal;
Q is a hydrocarbyl radical having 1 to 20 carbon atoms or is a halogen;
r is s minus 2, where s is the valence of $M^5$;
wherein $(CpR^*_q)$ has bilateral or pseudobilateral symmetry; $R^*_q$ is selected such that $(CpR^*_q)$ forms a fluorenyl, alkyl substituted indenyl, or tetra-, tri-, or dialkyl substituted cyclopentadienyl radical; and $(CpR''_p)$ contains a bulky group in one and only one of the distal positions;
wherein the bulky group is of the formula $AR^W_v$; and
where A is chosen from group 4 metals, oxygen, or nitrogen, and $R^W$ is a methyl radical or phenyl radical, and v is the valence of A minus 1.

35. The method of claim 17, wherein the single site catalyst precursor compound is represented by the formula:

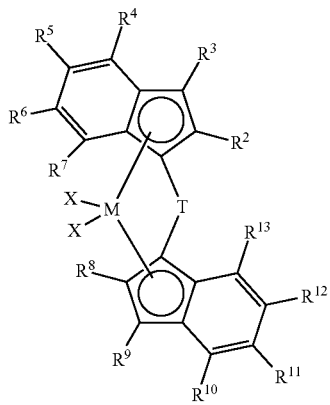

where:

M is a group 4, 5, or 6 metal;

T is a bridging group;

each X is, independently, an anionic leaving group;

each $R^2, R^3, R^4, R^5, R^6, R^7, R^8, R^9, R^{10}, R^{11}, R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

36. The method of claim 17, where the single site catalyst compound is represented by the formula:

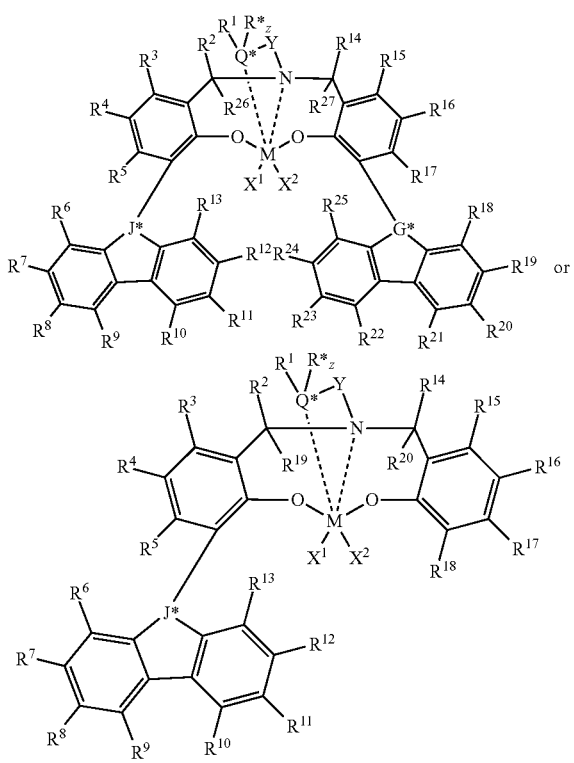

M is a group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1, R^2, R^3, R^4, R^5, R^6, R^7, R^8, R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;

Y is a divalent $C_1$ to $C_{20}$ hydrocarbyl or a substituted divalent hydrocarbyl group;

J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;

G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group Q* is a group 15 or 16 atom;

z is 0 or 1;

J* is CR" or N;

G* is CR" or N; and each $R", R^*, R^{11}, R^{12}, R^{13}, R^{14}, R^{15}, R^{16}, R^{17}, R^{18}, R^{19}, R^{20}, R^{21}, R^{22}, R^{23}, R^{24}, R^{25}, R^{26}$, and $R^{27}$ is, independently, as defined for $R^1$.

37. The method of claim 17, where the single site catalyst compound is represented by the formula:

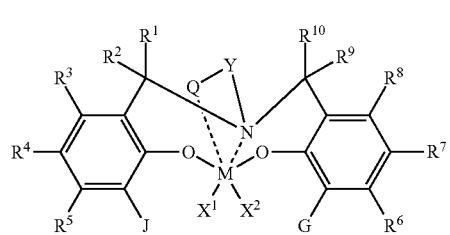

(I)

wherein M is a group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1, R^2, R^3, R^4, R^5, R^6, R^7, R^8, R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;

Q is a neutral donor group; and

J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;

G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group.

38. The process of claim 20, wherein the silica support, prior to combination with the alumoxane, has an average particle size of 50 µm or more; has an average surface area of from 450 to 800 m²/g; has an average pore diameter of from 50 to 70 Angstrom; and has an average pore volume of from about 0.5 to 2.5 ml/g of silica.

39. The process of claim 20, wherein the weight ratio of the supported alumoxane to the unsupported alumoxane is from about 1:1 to 1:15.

40. The process of claim 20, wherein the unsupported alumoxane particles have an average particle size of 2 to 20 µm.

41. The process of claim 20, wherein the unsupported alumoxane particles have a surface area differing by 10% or more from the surface area of the supported alumoxane particles.

42. The process of claim 20, wherein the support is spray dried.

43. The process of claim 20, wherein the single site catalyst precursor compound is selected from precursor compounds I and II;

wherein precursor compound I is represented by the following formula:

wherein:
each Cp is a cyclopentadienyl, indenyl, or fluorenyl moiety substituted by one or more hydrocarbyl radicals having from 1 to 20 carbon atoms;
$R^{A*}$ is a bridge between two Cp moieties;
$M^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp is the same or different;
n is 0 or 1, with the proviso that n=0 if m=1; and
k is such that k+m is equal to the oxidation state of $M^4$, with the proviso that if k is greater than 1, each Q is the same or different; and wherein precursor compound II is represented by the following formula:

wherein:
each Cp is a cyclopentadienyl moiety or substituted cyclopentadienyl moiety;
each $R^*$ and $R''$ is a hydrocarbyl group having from 1 to 20 carbon atoms and is the same or different;
p is 0, 1, 2, 3, or 4;
q is 1, 2, 3, or 4;
$R^{A*}$ is a structural bridge between the Cp moieties imparting stereorigidity to the metallocene compound;

$M^5$ is a group 4, 5, or 6 metal;
Q is a hydrocarbyl radical having 1 to 20 carbon atoms or is a halogen;
r is s minus 2, where s is the valence of $M^5$;
wherein $(CpR^*_q)$ has bilateral or pseudobilateral symmetry; $R^*_q$ is selected such that $(CpR^*_q)$ forms a fluorenyl, alkyl substituted indenyl, or tetra-, tri-, or dialkyl substituted cyclopentadienyl radical; and $(CpR''_p)$ contains a bulky group in one and only one of the distal positions;
wherein the bulky group is of the formula $AR^W_v$; and
where A is chosen from group 4 metals, oxygen, or nitrogen, and $R^W$ is a methyl radical or phenyl radical, and v is the valence of A minus 1.

44. The process of claim 20, wherein the single site catalyst precursor compound is represented by the formula:

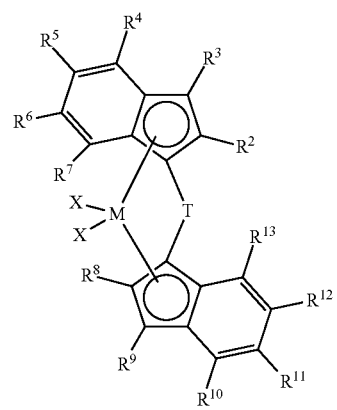

where:
M is a group 4, 5, or 6 metal;
T is a bridging group;
each X is, independently, an anionic leaving group;
each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'₂, —SR', —OR', —OSiR'₃ or —PR'₂ radical, wherein R' is one of a halogen atom, a $C_1$-$C_{10}$ alkyl group, or a $C_6$-$C_{10}$ aryl group.

45. The process of claim 20, where the single site catalyst compound is represented by the formula:

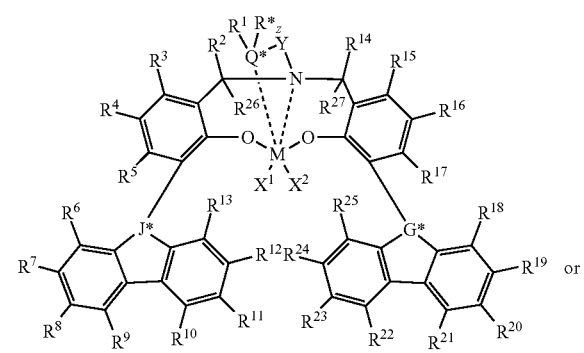

-continued

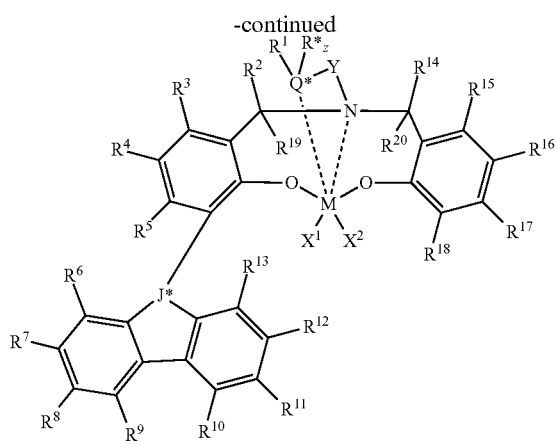

M is a group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;
Y is a divalent $C_1$ to $C_{20}$ hydrocarbyl or a substituted divalent hydrocarbyl group;
J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;
G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and
Y is a divalent $C_1$ to $C_{20}$ hydrocarbyl or a substituted divalent hydrocarbyl group
$Q^*$ is a group 15 or 16 atom;
z is 0 or 1;
$J^*$ is CR" or N;
$G^*$ is CR" or N; and each R", $R^*$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$.

46. The process of claim 20, where the single site catalyst compound is represented by the formula:

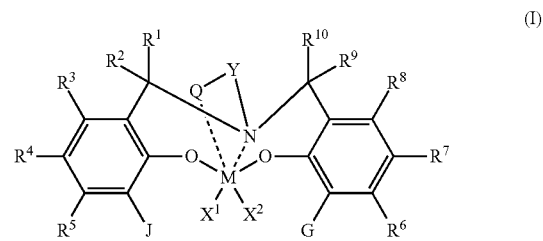

(I)

wherein M is a group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group, or two or more of $R^1$ to $R^{10}$ optionally independently join together to form a $C_4$ to $C_{62}$ cyclic or polycyclic ring structure, or a combination thereof;
Q is a neutral donor group; and
J is a $C_7$ to $C_{60}$ fused polycyclic group, which, optionally, comprises up to 20 atoms from groups 15 and 16, where at least one ring is aromatic and where at least one ring, which is optionally aromatic, has at least 5 members that is fused to at least one other cyclic group;
G is, independently, as defined for J, a hydrogen, a $C_1$ to $C_{60}$ hydrocarbyl radical, a substituted hydrocarbyl radical, a heteroatom, or a heteroatom-containing group, or optionally independently forms a $C_4$ to $C_{60}$ cyclic or polycyclic ring structure with $R^6$, $R^7$, or $R^8$ or a combination thereof; and
Y is a divalent $C_1$ to $C_{20}$ hydrocarbyl or a substituted divalent hydrocarbyl group.

47. The catalyst system of claim 15, wherein Q is a neutral donor group comprising at least one atom from group 15 or 16.

48. The method of claim 37, wherein Q is a neutral donor group comprising at least one atom from group 15 or 16.

49. The process of claim 46, wherein Q is a neutral donor group comprising at least one atom from group 15 or 16.

* * * * *